United States Patent [19]

Debesis et al.

[11] Patent Number: 5,737,650
[45] Date of Patent: Apr. 7, 1998

[54] PHOTOGRAPHIC MEDIUM CARTRIDGE WITH MAGNETICALLY ACTIVATED STATUS INDICATOR

[75] Inventors: John R. Debesis, Penfield; J. Kelly Lee; William Mey, both of Rochester; P. W. Thomas Moran, Fairport; Svetlana Reznik, Rochester, all of N.Y.

[73] Assignee: Eastman Kodak Company, Rochester, N.Y.

[21] Appl. No.: 766,958

[22] Filed: Dec. 16, 1996

[51] Int. Cl.⁶ ................................................. G03B 17/36
[52] U.S. Cl. ................................................. 396/285; 396/515
[58] Field of Search .................................. 396/281, 284, 396/285, 310, 311, 319, 320, 511, 512, 515

[56] References Cited

U.S. PATENT DOCUMENTS

| | | | |
|---|---|---|---|
| 1,963,096 | 6/1934 | Petit et al. | 95/9.19 |
| 2,248,293 | 7/1941 | Woolf et al. | 200/52 |
| 2,924,158 | 2/1960 | Kopp et al. | 95/31 |
| 3,109,113 | 10/1963 | Baudot | 310/13 |
| 3,259,768 | 7/1966 | Burr | 310/13 |
| 3,308,312 | 3/1967 | Ehrenberg | 310/13 |
| 4,166,264 | 8/1979 | Starr | 336/20 |
| 4,340,286 | 7/1982 | Carr | 354/105 |
| 4,443,077 | 4/1984 | Tanikawa | 354/21 |
| 4,482,232 | 11/1984 | Engelsmann et al. | 354/275 |
| 4,482,924 | 11/1984 | Brownstein | 358/209 |
| 4,490,027 | 12/1984 | Frank et al. | 354/21 |
| 4,678,299 | 7/1987 | Harvey | 354/21 |
| 4,860,037 | 8/1989 | Harvey | 354/21 |
| 4,903,053 | 2/1990 | Harvey | 354/21 |
| 4,965,600 | 10/1990 | Smart et al. | 354/212 |
| 4,965,627 | 10/1990 | Robison | 355/40 |
| 4,987,431 | 1/1991 | Harvey | 354/21 |
| 5,003,333 | 3/1991 | Earnhart | 354/218 |
| 5,023,642 | 6/1991 | Pagano | 354/275 |
| 5,083,155 | 1/1992 | Kataoka et al. | 355/75 |
| 5,153,625 | 10/1992 | Weber | 354/173.1 |
| 5,159,365 | 10/1992 | Takahashi et al. | 354/21 |
| 5,278,600 | 1/1994 | Takahashi et al. | 354/275 |
| 5,299,754 | 4/1994 | Lackowski | 242/197 |
| 5,323,984 | 6/1994 | Lackowski | 242/197 |
| 5,392,020 | 2/1995 | Chang | 336/200 |
| 5,483,310 | 1/1996 | Tanii et al. | 354/21 |
| 5,548,368 | 8/1996 | Lee et al. | 354/275 |

*Primary Examiner*—David M. Gray
*Attorney, Agent, or Firm*—Charles E. Snee, III

[57] ABSTRACT

A cartridge (10) of web material includes a hollow cartridge body (14) having an exit slit (26); a strip or sheet (12) of web material enclosed in the cartridge body to be withdrawn from or inserted into the cartridge body via the exit slit; at least one magnetic member (38, 40; 130; 172–178; 240; 290,292) carried on the strip or sheet; and a magnetically actuated visual indicator (36) mounted on the cartridge body adjacent the exit slit to be actuated by the magnetic member when the strip or sheet is withdrawn from or inserted into the cartridge body.

65 Claims, 13 Drawing Sheets

PHOTOGRAPHIC MEDIUM CARTRIDGE WITH MAGNETICALLY ACTIVATED STATUS INDICATOR

DESCRIPTION

1. Technical Field

The invention relates to a cartridge for web material, the cartridge having an indicator to show the status of the web material. More particularly, the invention relates to such a cartridge for a light-sensitive medium, such as a photographic filmstrip or film sheet or a roll of photographic paper, in which the indicator is actuated magnetically in response to movement of the medium from and into the cartridge.

2. Background of the Invention

Conventional cartridges for photographic filmstrips are known which include a supply spool onto which a filmstrip is wound, a surrounding cylindrical shell, suitable closures or caps at opposite ends of the shell, an exit slit through which the filmstrip may be withdrawn from or wound into the cartridge, and a suitable light-locking feature at the exit slit. In a well-known cartridge for 35 mm filmstrips, the light-locking feature comprises a pair of strips of plush material mounted on opposite sides of the exit slit to engage the filmstrip and prevent leakage of light into the cartridge. Cartridges for the recently announced Advanced Photographic System also are also known which include a light-locking door at the exit slit, rather than strips of plush material. At assembly of a cartridge using strips of plush material, a leading portion of the filmstrip is left extended through the exit slit to facilitate loading into a camera. In advanced cartridges, the entire filmstrip is wound into the cartridge and the door is closed, not to be opened until the cartridge has been installed in a camera. Motion picture film and microfilm cartridges also are known in which an elongated strip of film is enclosed within a light-tight housing and withdrawn through a light-locking feature prior to exposure.

To load most 35 mm cameras, a conventional film cartridge is inserted into a loading chamber on one side of a camera and the leading portion of the filmstrip is placed over a take-up spool on an opposite side. In some cameras, the leading portion must be manually attached to the take-up spool before a rear door of the camera is closed. Then, a film loading operation is performed by the user of the camera, for example, by manually pivoting or rotating a winding lever to rotate the take-up spool and depressing a shutter release button several times, until a sufficient length of the leading portion has been wound onto the take-up spool and the first frame has been properly positioned for exposure. In other 35 mm cameras, the leading portion is automatically secured to the take-up spool at the beginning of a film loading operation. For example, the take-up spool is rotated by a motor drive and one or more teeth of the spool engage perforations in the leading portion to wind the leading portion onto the spool until the first frame has been properly positioned. A spring-like deflector or similar feature may be provided on the rear door to press the leading portion against the take-up spool to ensure proper engagement with the teeth of the spool.

A problem that exists in some 35 mm cameras is that the leading portion of the filmstrip from a conventional cartridge may not properly engage with the take-up spool before the rear door is closed or may become disengaged after the door is closed. Thus, the filmstrip will not be wound onto the take-up spool; and neither the first nor subsequent frames will be positioned for exposure. Since the rear door of the camera is closed, the user may not be aware of this situation. So, a need has existed for a cartridge feature for indicating when a conventional 35 mm filmstrip has been properly loaded into a camera.

After all exposures have been made on such a conventional 35 mm filmstrip, the filmstrip is wound back into the cartridge; and the cartridge is removed from the camera. Typically, the entire filmstrip is wound past the strips of plush material and completely into the cartridge; so that, the leading portion is no longer visible or accessible to the user. Thus, a conventional 35 mm cartridge without a visible leading portion typically can be assumed to contain a filmstrip which has been fully exposed. However, a problem is that a user occasionally may neglect to wind an exposed filmstrip completely into a conventional cartridge; so that, the leading portion is left extended from the exit slit. In such a case, once the conventional cartridge of exposed film is removed from the camera, the user may not be able to distinguish it from a cartridge of unexposed film also having a leading portion extended from its exit slit. Thus, the user may accidentally load a cartridge of exposed film into a camera and produce a filmstrip of useless double exposures. Moreover, users sometimes accidentally rotate the spool of a cartridge of unexposed film; so that, the leading portion is drawn into the cartridge, making it impossible to distinguish such a cartridge of unexposed film from one of exposed film. Thus, the user may send a cartridge of unexposed film for developing and printing and waste an entire filmstrip. So a need has existed for a cartridge feature for indicating whether a conventional 35 mm filmstrip is exposed or unexposed.

SUMMARY OF THE INVENTION

The primary objective of the invention is to provide a cartridge for a strip of web material, such as photographic film or photographic paper, the cartridge including an indicator to show the status of the web material.

A further objective is to provide such a cartridge for photographic film or paper in which the indicator shows whether the film or paper is exposed or unexposed.

Another objective is to provide such a cartridge for photographic film in which the indicator shows whether the film has been successfully loaded into a camera.

Yet another objective is to provide such a cartridge for photographic film in which the indicator shows a number of exposures made or remaining to be made on the film.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

In a broad sense, the invention concerns a cartridge of web material which includes a hollow cartridge body having an exit slit; a strip or sheet of web material enclosed in the cartridge body to be withdrawn from or inserted into the cartridge body via the exit slit; at least one magnetic member carried on the strip or sheet; and a magnetically actuated visual indicator mounted on the cartridge body adjacent the exit slit to be actuated by the magnetic member when the strip or sheet is withdrawn from or inserted into the cartridge body.

In a first embodiment, the magnetically actuated indicator comprises a frame supported on the cartridge body; a magnet supported by the frame for rotation about an axis; a first indicium on the magnet for showing a first status of the strip or sheet; a second indicium on the magnet for showing a second status of the strip or sheet; and an opening in the frame through which one of the indicia is visible externally of the indicator, whereby movement of the magnetic member past the magnet causes the magnet to rotate from a first position revealing the first indicium through the opening, to a second position revealing the second indicium.

In a second embodiment, the magnetically actuated indicator comprises a frame supported on the cartridge body; an indicator member supported by the frame for rotation about an axis; a member of soft magnetic material supported by the indicator member; a first indicium on the indicator member for showing a first status of the strip or sheet; a second indicium on the indicator member for showing a second status of the strip or sheet; and an opening in the frame through which one of the indicia is visible externally of the indicator, whereby movement of the magnetic member past the soft magnetic material causes the indicator member to rotate from a first position revealing the first indicium through the opening, to a second position revealing the second indicium.

In a third embodiment, wherein the web material is a light sensitive photographic medium, the indicator comprises a substrate; a plurality of flexible members extended from the substrate, each flexible member having a tip and first and second sides on opposite sides of the tip, the flexible members being spaced from each other along the substrate; a corresponding plurality of deposits of magnetic particles, one deposit on the tip of each of the flexible members; a first indicium on the substrate between the flexible members for showing a first status of the photographic medium; and a second indicium on the first side of each flexible member for showing a second status of the photographic medium, whereby movement of the magnetic member past the flexible members causes the flexible members to flex from a first position revealing the first indicium, to a second position revealing the second indicium.

In a fourth embodiment, the magnetic member comprises a magnetic track extended along the strip or sheet in a direction of withdrawal from the cartridge body, the track having first and second portions, the portions being located at first and second distances from a longitudinal edge of the strip or sheet; and the visual indicator comprises a pointer member, a pivot for the pointer member supported on the cartridge body, and a magnet supported on the pointer member and spaced from the pivot, the magnet being located opposite the magnetic track, whereby as the strip or sheet is withdrawn from the cartridge body, the magnet follows the magnetic track from the first portion to the second portion, thereby rotating the pointer member on the pivot to indicate changes in status of the strip or sheet.

In a fifth embodiment, the magnetic member comprises a plurality of magnetic tracks extended along the strip or sheet parallel to a direction of withdrawal from the cartridge body; and the visual indicator comprises a corresponding plurality of magnetically actuated bi-stable elements supported on the cartridge body, and a corresponding plurality of ferromagnetic flux conductors extended between the tracks and the bi-stable elements, whereby, as the strip or sheet is withdrawn from the cartridge body, the bi-stable elements can change from a first to a second state in response to signals magnetically recorded on the tracks and transmitted to the bi-stable elements by the flux conductors.

In a sixth embodiment, the magnetic member comprises a magnetic stripe extended transverse to a direction of withdrawal from the cartridge body; and the magnetically actuated indicator comprises a frame supported on the cartridge body; an indicator member supported by the frame for rotation about an axis; a first indicium on the indicator member for showing a first status of the strip or sheet; a second indicium on the indicator member for showing a second status of the strip or sheet; an opening in the frame through which one of the indicia is visible externally of the indicator; a magnet rotatably supported by the frame, the magnet being coupled to the indicator member; and a pair of ferromagnetic conductors, each having a first end positioned to influence the magnet and a second end positioned to be influenced by the magnetic stripe, whereby movement of said magnetic stripe past the second ends induces a magnetic flux at the first ends which causes the magnet and the indicator member to rotate from a first position revealing the first indicium through the opening, to a second position revealing the second indicium.

In a seventh embodiment, the magnetic member comprises a pair of magnetic tracks on the strip or sheet extended in a direction of withdrawal from the cartridge body; and the magnetically actuated indicator comprises a frame supported on the cartridge body; an indicator wheel supported by the frame for rotation, the wheel having a first number of radially outwardly extended gear teeth, the gear teeth and spaces between the gear teeth having opposite magnetic polarities; a first indicium on the indicator wheel for showing a first status of the strip or sheet; a second indicium on the indicator wheel for showing a second status of the strip or sheet; an opening in the frame through which one of the indicia is visible externally of the indicator; a plurality of stator sectors supported by the frame around the indicator wheel, the stator sectors being circumferentially spaced from each other around a toothed opening having a second, greater number of radially inwardly extended gear teeth; first and second ferromagnetic flux conductors extended, respectively, from first and second stator sectors on one side of the toothed opening, into proximity with a first of the magnetic tracks; and third and fourth ferromagnetic flux conductors extended, respectively, from third and fourth stator sectors on an opposite side of the toothed opening from the first and second stator sectors, into proximity with a second of the magnetic tracks, whereby movement of signals recorded on the magnetic tracks past the flux conductors induces magnetic polarities in the first to fourth stator sectors which cause the indicator wheel to roll along the toothed opening from a first position revealing the first indicium to a second position revealing the second indicium.

Another embodiment concerns a light sensitive photographic medium, comprising a strip or sheet of web material; a light sensitive photographic material on the strip or sheet; and at least one magnetic member carried on the strip or sheet for actuating an indicator on a cartridge body for the strip or sheet.

The invention provides various advantages. Proper loading of a cartridge into a camera or other associated apparatus can be easily confirmed by observing the indicator while the cartridge is in the camera or apparatus. This helps avoid operation of the camera or apparatus when the web material is not being advanced from the cartridge. With most embodiments, exposure of a photographic medium within a cartridge can be confirmed whether the cartridge is in a camera or has been removed. This helps to avoid double exposing of the photographic medium. The indicator can be applied to existing cartridge designs without requiring modification of the structure of the cartridge or with only rather minor modifications. The indicator can be configured to indicate the number of exposures made or remaining to be made on a photographic medium.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

The following is a detailed description of various embodiments of the invention, reference being made to the several Figures.

Figure 1:
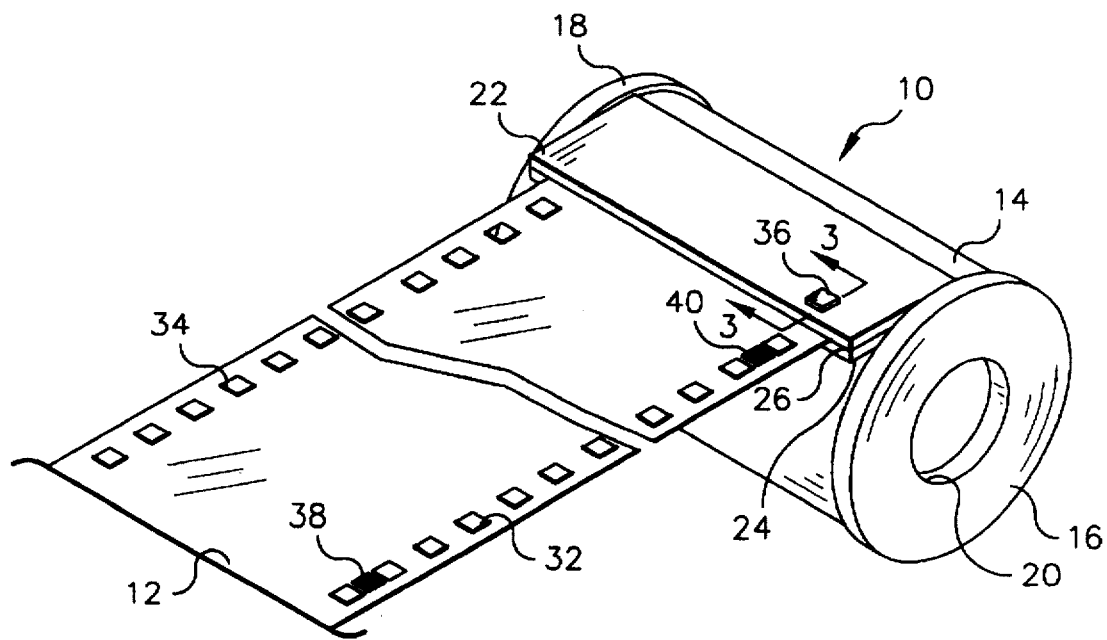
FIG. 1 shows a perspective view of a cartridge embodying a magnetically actuated, visual status indicator in accordance with the invention.

FIG. 1 shows a conventional cartridge 10 such as commonly used for 35 mm photographic film. Although this description will refer mainly to cartridges enclosing filmstrips wound onto a spool, those skilled in the art will appreciate that the magnetically actuated visual indicators according to the invention could readily be used with other web materials bearing light-sensitive, photographic media, such as photographic paper. The skilled persons further will appreciate that the indicators also could readily be used with cartridges for sheets of web material such as photographic film or paper. Of course, the indicators could just as readily be used for cartridges of many other types of web materials.

Cartridge 10 encloses a strip or sheet 12 of web material such as a photographic filmstrip, within a hollow cartridge body or shell 14 which is closed by a pair of end caps 16, 18. Openings through the end caps, such as opening 20, provide access in the familiar manner to an enclosed spool for the filmstrip. Shell 14 includes a pair of parallel lips 22, 24 between which an exit slit 26 is defined, through which strip 12 can be withdrawn from or inserted into the cartridge. To prevent leakage of light into the cartridge, a pair of conventional strips 28, 30 of black velvet plush are attached to the inside surfaces of lips 22, 24. Perforations 32, 34 may be provided along one or both edges of strip 12. For ease of illustration, strip 12 is shown essentially fully withdrawn from the cartridge; however, those skilled in the art will understand that when the cartridge is initially loaded into a camera, only a short leading portion of film will extend past lips 22, 24.

Figure 2:
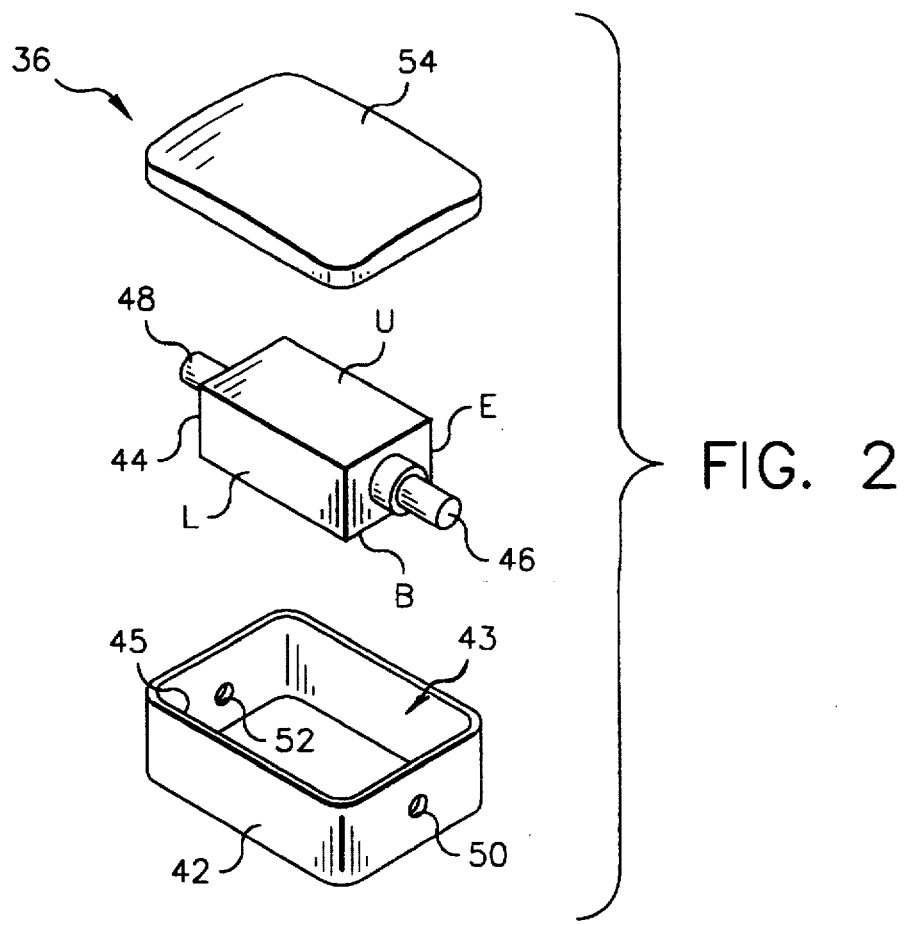
FIG. 2 shows an exploded view of a first embodiment of a magnetically actuated status indicator.
Figure 3:
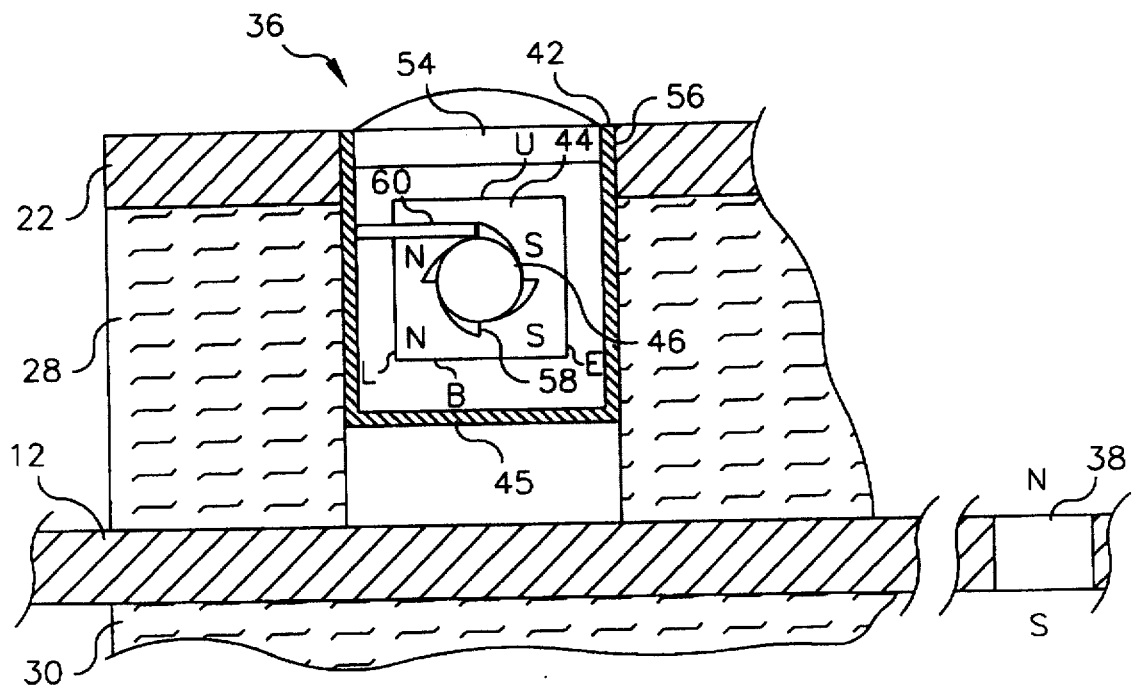
FIG. 3 shows a sectional view taken along line 3—3 of FIG. 1, with the indicator positioned to show an unexposed U status.
Figure 4:
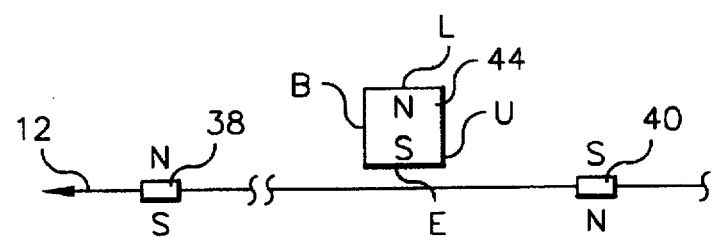
FIG. 4 shows a schematic view of the indicator positioned to show a loaded L status.
Figure 5:
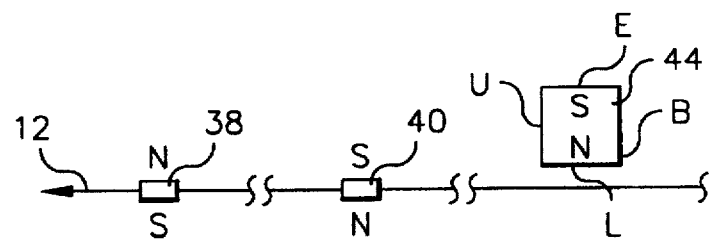
FIG. 5 shows a schematic view of the indicator positioned to show an exposed E status.

Near one end of lip 22, a magnetically actuated visual indicator 36 is mounted in accordance with the invention. In order to actuate indicator 36 to show changes in the status of strip 12, a pair of magnetic members 38, 40 are secured to the strip at locations spaced along the edge nearest the indicator. To avoid possibly interfering with exposures on the central portion of the filmstrip, members 38, 40 preferably are located near a longitudinal edge of the filmstrip; however, they could be located on leader or trailer portions or between exposure frames across the width of the filmstrip, and indicator 36 could be located anywhere across the width of lip 22. In the embodiment of FIGS. 1 to 3, members 38, 40 preferably are discrete permanent magnets mounted between adjacent perforations. For example, the magnets may be snapped into holes, not illustrated, or simply adhered to strip 12 between perforations. Members 38, 40 may be made from a high energy magnetic material, such as sintered anisotropic or bonded isotropic neodymium-iron-boron material. Other suitable high energy magnetic materials or rare earth magnets include sintered anisotropic or bonded isotropic samarium-cobalt; and other magnetic materials which exhibit magnetic properties of: residual induction (Br) greater than 6,000 Gauss; coercive force (Hc) in a range of 6,000 to 10,000 Oe; and maximum energy product (BH)max in a range of 8.0 to 40.0 MGOe. Materials with such high magnetic strengths permit the use of smaller magnets, a consideration in some applications for the cartridges according to the invention. In the illustrated embodiment, member 38 is mounted with its N pole upward and at a distance from the leading end of strip 12 which will place member 38 next to indicator 36 when the filmstrip has been properly loaded into a camera. Similarly, member 40 is mounted with its S pole upward and at a greater distance from the leading end which will place member 40 next to indicator 36 when the last frame of the filmstrip has been exposed.

As shown in FIGS. 2 and 3, a first embodiment of indicator 36 includes an annular, rectangular frame 42 of an opaque, non-magnetic material, having a central opening 43 and a bottom wall 45. Within the frame is mounted a parallelepiped magnet 44 of the same material as members 38, 40. A pair of coaxial stub shafts 46, 48 rotatably support magnet 44 in plain bearings 50, 52 formed in frame 42. Preferably, the axis of shafts 46, 48 extends more or less transverse to strip 12, as illustrated; however, the axis also may extend essentially parallel or perpendicular to the strip, not illustrated. Magnet 44 is poled N, S as shown in FIG. 3. On a surface between the pole faces, an indicium U is provided to indicate an unexposed status of the filmstrip. On a surface at pole N of the magnet, an indicium L is provided to indicate a properly loaded status. On a surface at pole S, an indicium E is provided to indicate a fully exposed status. Finally, between indicia L and E, a blank surface B is provided. Indicia U, L and E may be symbols, letters, words, distinctive colors, or combinations of these. A transparent cover or lens 54 is fitted into frame 42 above magnet 44 to enable a user to visually observe the indicium facing the lens.

As shown in FIG. 3, an opening 56 is provided through lip 22 and plush strip 28; and frame 42 is securely mounted therein. Alternatively, if the material of lip 22 is non-magnetic, indicator 36 could simply be mounted on the exterior surface of lip 22. However, such an arrangement might not be compatible with all cameras or other associated apparatus where space is limited. FIG. 3 and the other figures of this description show the structure of indicator 36 on a greatly expanded scale, for ease of illustration. Those skilled in the art will appreciate that the actual dimension, for example, from lip 22 to the centerline of strip 12 of a cartridge for 35 mm film would be on the order of a fraction of a millimeter or so. To allow magnet 44 to rotate only during withdrawal of strip 12 from the cartridge, stub shaft 46 may include a boss having a plurality equally spaced of ratchet teeth 58, corresponding in number to the four sides of magnet 44. A flexible anti-reverse pawl 60 is fixed at one end to frame 42 and extends into proximity with ratchet teeth 58; so that, magnet 44 can rotate counter-clockwise as seen in FIG. 3, but not clockwise.

In operation of the embodiment of FIGS. 1 to 5, magnet 44 is positioned at assembly of the cartridge with indicium U facing lens 54 and poles N, S aligned essentially parallel to strip 12. Magnetic elements 38, 40 are located within the cartridge, as initially assembled. Thus, the user can tell by looking at indicator 36 that the enclosed film is unexposed. The position of the indicator will not change should the user accidentally rotate the spool of the cartridge and wind the leading end of strip 12 into the cartridge before loading the cartridge into a camera. When the cartridge is properly loaded into the camera, strip 12 will have been withdrawn far enough to move magnetic element 38 toward and then past indicator 36; so that, magnet 44 will flip from the position of FIG. 3 to that of FIG. 4 with indicium L facing lens 54. Through a window provided in a camera, not illustrated, the user can tell by looking at indicator 36 that the enclosed film has been properly loaded. Later, when all of the frames on the filmstrip have been exposed, magnetic element 40 will have moved toward and then past indicator 36; so that, magnet 44 will flip from the position of FIG. 4 to that of FIG. 5 with indicium E facing lens 54. The user can then tell that the enclosed film has been exposed. Due to the effect of ratchet teeth 58 and pawl 60, magnet 44 will remain in the position of FIG. 4 when strip 12 is wound back into cartridge 10 prior to removal from the camera. Thus, indicator 36 will continue to show that the film has been exposed.

Figure 6:
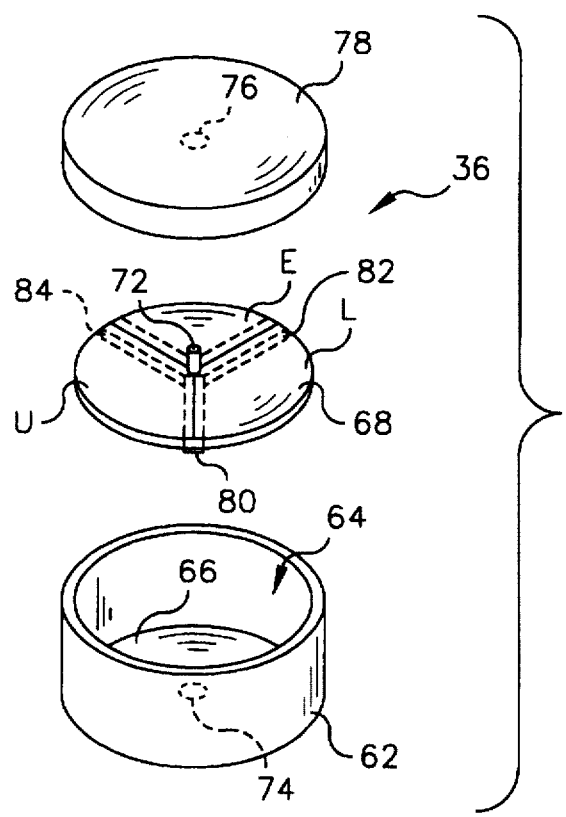
FIG. 6 shows an exploded view of a second embodiment of a magnetically actuated, visual status indicator in accordance with the invention.
Figure 7:
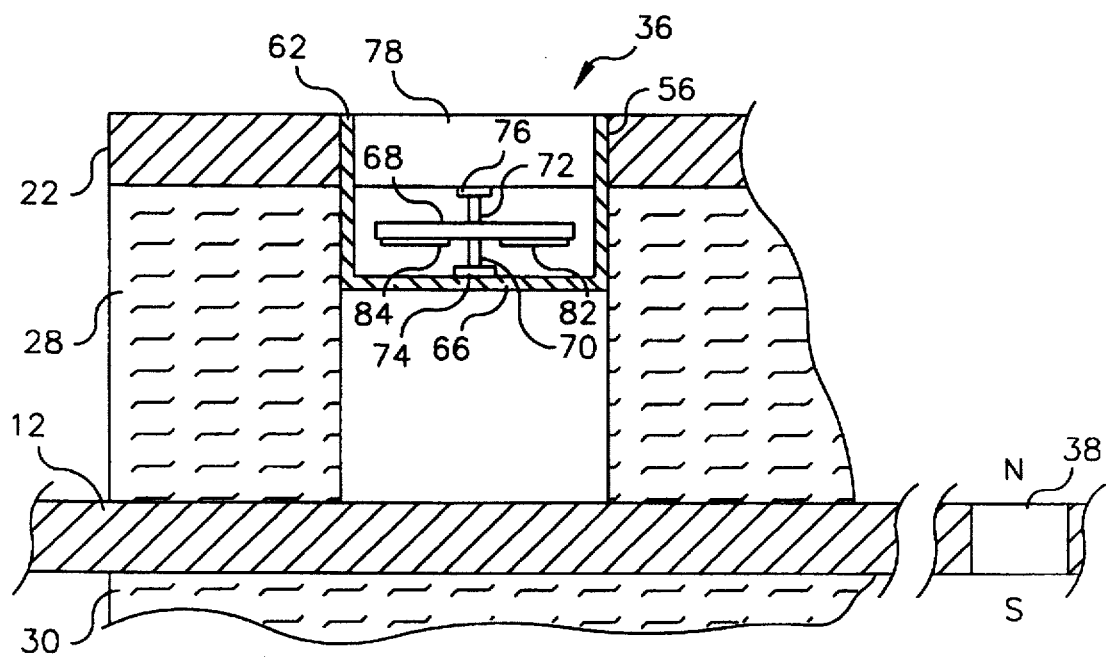
FIG. 7 shows a sectional view of the indicator of FIG. 6, as installed in a cartridge.

FIGS. 6 and 7 show features of a second embodiment of indicator 36. In this instance, a circular cylindrical frame 62 of an opaque, non-magnetic material has an upper opening 64 and a bottom wall 66. The indicator may be mounted within an opening 56, as shown, or on the exterior surface of lip 22, if the material of lip 22 is non-magnetic. Within frame 62 an indicator member 68, which may be a circular disk of non-magnetic material, includes a pair of coaxial stub shafts 70, 72. Indicia U, L and E are provided on an upper surface of member 68, as shown schematically in FIG. 6. Alternatively, portions of member 68 may be transparent or perforated to reveal indicia applied to bottom wall 66. Preferably, stub shafts 70, 72 are on an axis essentially perpendicular to the plane of strip 12; however, when space allows, the axis could be parallel to the strip if the indicia are provided on the circumferential surface of member 68, not illustrated. A plain bearing 74 in bottom wall 66 rotatably supports stub shaft 74, while a plain bearing 76 is provided for stub shaft 72 on an under side of a transparent cover or lens 78 fitted into frame 62 above member 68. Lens 78 may be provided with a mask, not illustrated; so that, only one of the indicia will be visible at a given time. On an under side of member 68 are mounted a plurality, such as a trio, of strips or bars 80, 82, 84 of conventional soft magnetic material such as cold rolled steel, low silicon iron or other temporarily magnetizable material. The bars may be mounted, for example, below boundaries between indicia U, L and E as shown in FIG. 6. An anti-reverse mechanism, not illustrated but similar to ratchet teeth 58 and pawl 60 of FIG. 3, preferably is provided to prevent reverse rotation of member 68; however, a minimum of three ratchet teeth would be needed, though a greater number could be used.

In operation of the embodiment of FIGS. 6 and 7, indicator 36 is installed during assembly of the cartridge with indicium U visible through lens 78. Magnetic elements 38, 40 are located within the cartridge, as initially assembled. Thus, the user can tell by looking at indicator 36 that the enclosed film is unexposed. Because of the anti-reverse mechanism, the position of the indicator will not change should the user accidentally wind the leading end of strip 12 into the cartridge before loading. When the cartridge is properly loaded into the camera, strip 12 will have been withdrawn far enough to move magnetic element 38 toward and then past indicator 36; so that, one of strips 80, 82, 84 will be pulled along by magnetic element 38, thereby rotating indicator member 68 until indicium L is facing lens 78. Thus, the user can tell by looking at indicator 36 that the enclosed film has been properly loaded. Later, when all of the frames on the filmstrip have been exposed, magnetic element 40 will have moved toward and then past indicator 36; so that, the next of strips 80, 82, 84 will be pulled along, thereby rotating indicator member 68 until indicium E is facing lens 78. The user can then tell that the enclosed film has been exposed. Due to the effect of ratchet teeth 58 and pawl 60, indicator member 68 will remain in the exposed position when strip 12 is wound back into cartridge 10 prior to removal from the camera. Thus, indicator 36 will continue to show that the film has been exposed.

Figure 8:
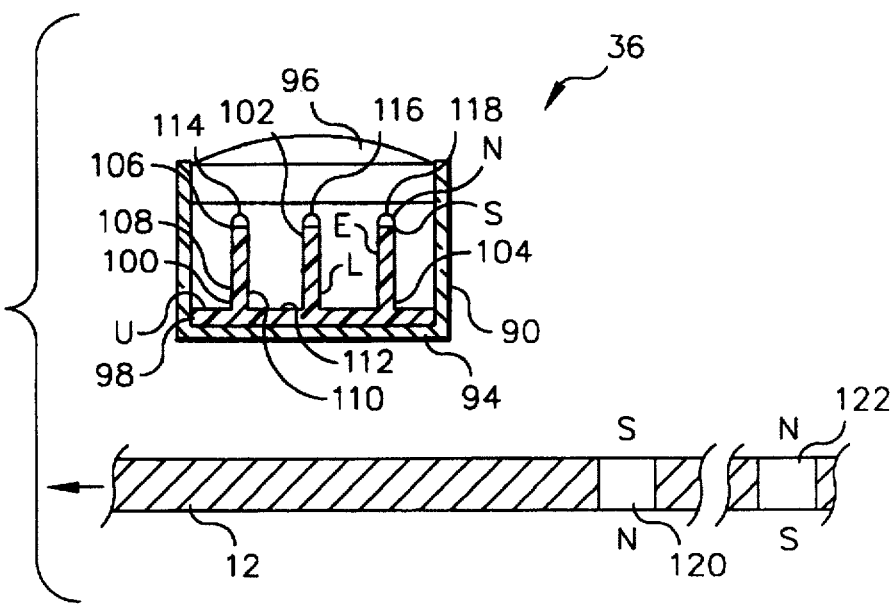
FIG. 8 shows a schematic sectional view of a third embodiment of a magnetically actuated, visual status indicator in accordance with the invention, as oriented to show an unexposed U status.
Figure 9:
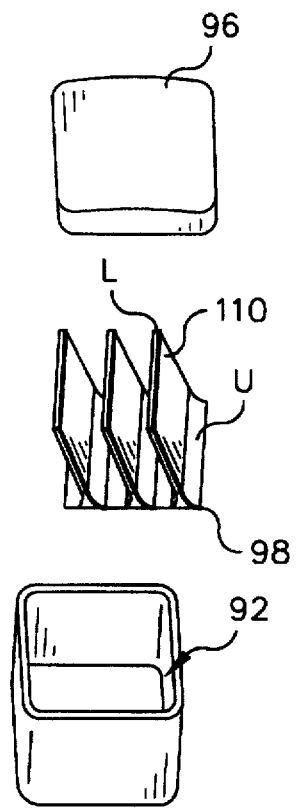
FIG. 9 shows an exploded view of the indicator of FIG. 8 as oriented to show a loaded L status.
Figure 10:
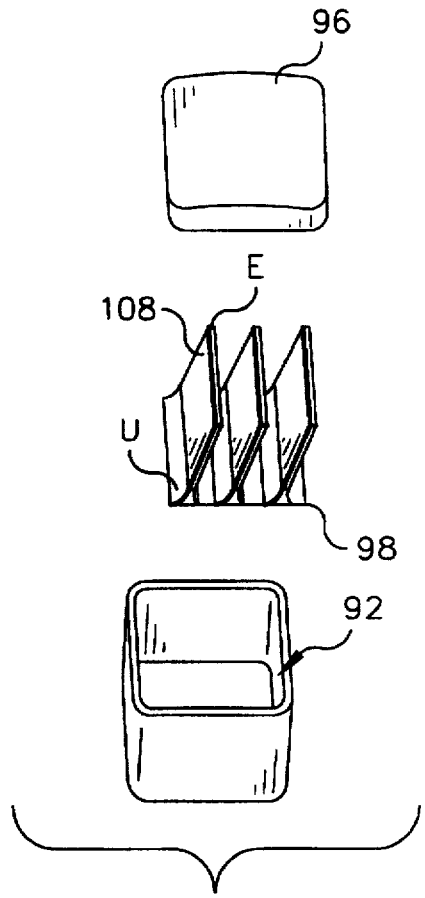
FIG. 10 shows an exploded view of the indicator of FIG. 8 as oriented to show an exposed E status.

FIGS. 8 to 10 show features of a third embodiment of indicator 36. An annular rectangular frame 90 of an opaque, non-magnetic material has an upper opening 92 and a bottom wall 94. A transparent cover or lens 96 is fitted into the open end of frame 90. At assembly of a cartridge, frame 90 would be bonded to an outer surface of lip 22 or inserted into an opening through the lip as in the indicator of FIG. 3. Supported on the bottom wall is an indicator device including a substrate 98 from which extend a plurality of flexible vane-like or leaf-like members 100, 102, 104, each member having at its free end a tip 106. Preferably, the flexible members are integrally formed with the substrate, such as by molding or coextruding a suitable plastic. Those skilled in the art will appreciate that the indicator device 98–104 could be made using conventional photo-lithographic techniques. Each of flexible members 100, 102, 104 comprises a first side surface 108 bearing an indicium E for exposed film and a second side surface 110 bearing an indicium L for properly loaded film. Between the flexible members, an upper surface 112 of substrate 98 bears an indicium U for unexposed film. Sputtered or dip-coated onto tips 106 are deposits 114, 116, 118 of magnetic material such as used in conventional recording media, which have been poled to exhibit N, S poles as illustrated. A first magnetic member 120 is mounted on strip 12 with its S pole upward and at a distance from the leading end of strip 12 which will place member 120 next to indicator 36 when the filmstrip has been properly loaded into a camera. Similarly, a second magnetic member 122 is mounted with its N pole upward and at a greater distance from the leading end which will place member 122 next to indicator 36 when the last frame of the filmstrip has been exposed. Members 120, 122 may be permanent magnets similar to magnets 38, 40.

In operation of the embodiment of FIGS. 8 to 10, with the flexible members in their erect position as shown in FIG. 8, the user can observe surface 112 to see that the film is unexposed. But, when strip 12 is withdrawn from the cartridge during loading into a camera, approach of magnetic member 120 causes a repulsive force to develop between the S poles of the flexible members and the S pole of member 120, which causes the flexible members to flex to the left, as viewed in FIG. 9. Thus, surfaces 110 and indicium L can be seen by the user through a window in the camera, indicating that the film has been properly loaded. Later, when the last frame on the strip has been exposed, approach of magnetic member 122 causes an attractive force to develop between the S poles of the flexible members and the N pole of member 122, which causes the flexible members to flex to the right, as viewed in FIG. 10. Thus surfaces 108 and indicium E can be seen by the user, indicating that the film has been exposed. When strip 12 is wound back into the cartridge, the process reverses, since no mechanism is provided for holding the flexible members in a position with indicium E visible to the user after magnetic member 122 has moved into the cartridge. Thus, the indicator of FIGS. 8 to 10 is useful primarily to show a change of status from unexposed, to loaded, to exposed, while the cartridge is in a camera.

The indicia U, L, and E may be provided on surfaces 108, 110, 112 in any convenient manner. For example, after deposits 114, 116, 118 have been coated onto tips 106, conventional vacuum deposition techniques may be used to coat surface 112 with a suitable color. If necessary, magnets may be used to cause the flexible members to bend first to the right to allow a second color to be coated onto surfaces 108, and then to the left to allow a third color to be coated onto surfaces 110. Or, the substrate and flexible members may be coextruded using distinctly colored plastic materials at surfaces 108, 110, 112.

Figure 11:
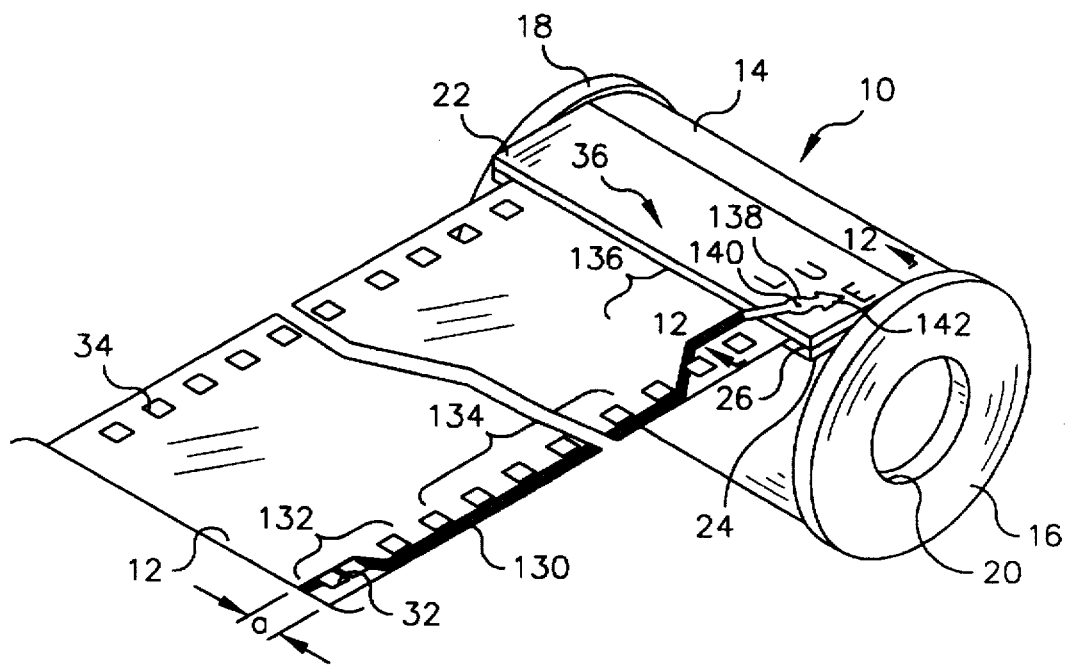
FIG. 11 shows a perspective view of a cartridge embodying a fourth embodiment of a magnetically actuated, visual status indicator in accordance with the invention.
Figure 12:
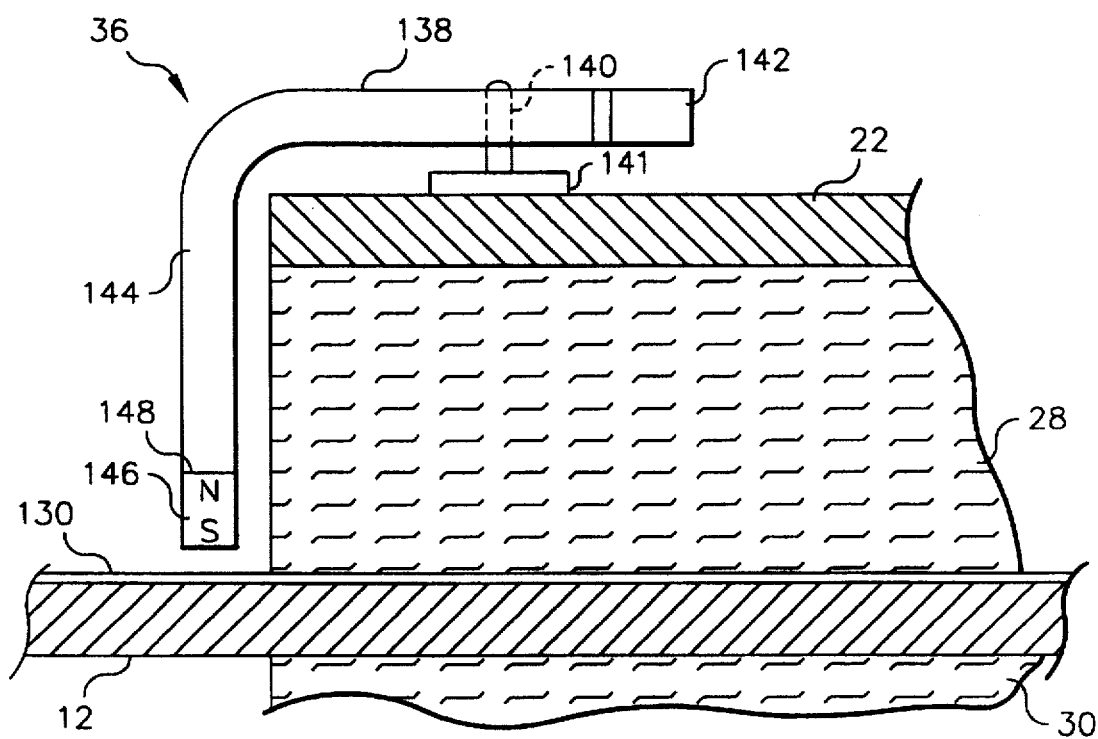
FIG. 12 shows a sectional view along line 12—12 of FIG. 11.
Figure 13:
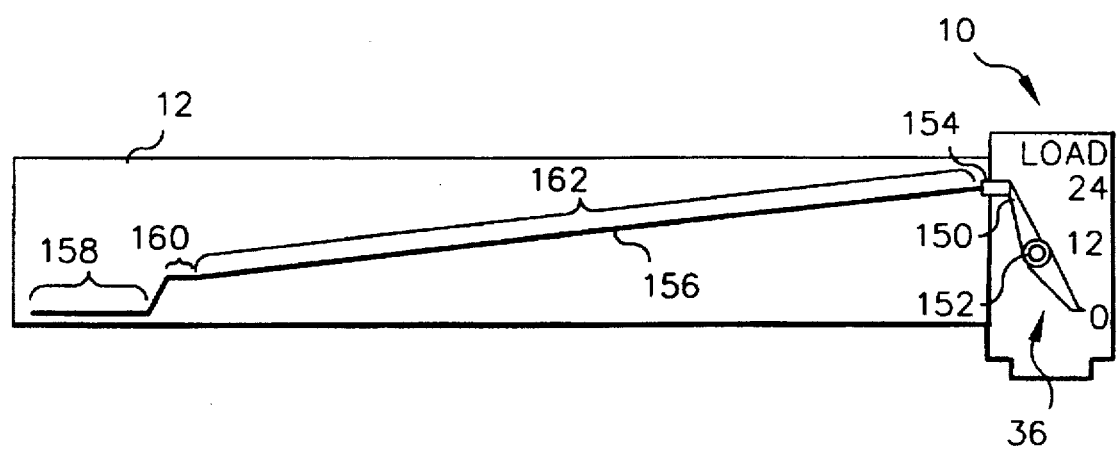
FIG. 13 shows a schematic view of a variation of the embodiment of FIG. 11.

FIGS. 11 to 13 show features of a fourth embodiment of indicator 36. A discrete magnetic stripe or track 130 is coated onto the back side of strip 12 and extends generally longitudinally of the strip. For example, track 130 could comprise a coating including isotropic powdered neodymium-iron-boron or samarium-cobalt in a suitable thick film polymer carrier such as the carriers used in known conductive inks. The magnetic material should have an energy product of about 10 MGOe. In the embodiment of FIGS. 11 and 12, track 130 comprises a first, rather short portion 132 which extends essentially parallel to, and at a distance $\alpha$ from, one edge of strip 12, near the leading portion of the strip which extends from the cartridge prior to loading into a camera. After portion 132, track 130 comprises a much longer portion 134 which extends essentially along the same one edge of the strip. After portion 134, track 130 comprises a further, rather short portion 136 which extends essentially parallel to, and at a distance greater than $\alpha$ from, the same one edge of the strip. An indicator member or pointer 138 is supported on a pivot 140 mounted on a base 141 secured to lip 22. A tip 142 of pointer 138 extends away from pivot 140 toward indicia L, U, and E which may be printed or labeled onto lip 22, as indicated in FIG. 11. Opposite tip 142, a transverse portion 144 of pointer 138 extends past lip 22 and downward toward strip 12. A small magnet 146, of the same material as members 38, 40, is supported on an end 148 of portion 144, just above track 130.

In operation of the embodiment of FIGS. 11 and 12, portion 132 is left extended from the cartridge at assembly. Thus, magnet 146 is attracted to track 130 and holds pointer 138 with tip 142 pointed to indicium U. Thus, the user can see that the film is unexposed. When strip 12 has been withdrawn from the cartridge sufficiently far for proper loading into a camera, magnet 146 follows track 130 onto portion 134 and thus swings pointer 138 counter-clockwise until tip 142 points to indicium L. The indicium L continues to be visible to the user through a window in the camera as exposures are made. Eventually, when the last exposure has been made, magnet 146 follows track 130 onto portion 136 and thus swings pointer 138 clockwise until tip 142 points to indicium E. When strip 12 is wound back into the cartridge, the process reverses, since no mechanism is provided for holding the pointer at indicium E as track 130 moves back into the cartridge. Thus, the indicator of FIGS. 11 and 12 is useful primarily to show a change of status from unexposed, to loaded, to exposed, while the cartridge is in a camera. Those skilled in the art will appreciate that an anti-reverse mechanism could be used if portions 132, 134, 136 moved progressively toward or away from the edge of the film, not illustrated; so that, pointer 138 would move continuously in one direction from U, to L, to E. For example, see the embodiment of FIG. 13.

FIG. 13 shows a variation of the embodiment of FIGS. 11 and 12, in which a pointer on the cartridge indicates the number of frames which have been exposed. A frame number indicator pointer or member 150 is supported on a pivot 150 which may be mounted to the cartridge in the manner of pointer 138. A transverse portion 154, similar in configuration to portion 144, extends over lip 22 to a discrete magnetic stripe or track 156. The opposite end of pointer 150 extends toward indicia printed or labeled onto the cartridge, such as "Load" and several frame numbers, as indicated. In this instance, track 156 comprises a first, rather short portion 158 which extends essentially parallel to and along one edge of strip 12, near the leading portion of the strip which extends from the cartridge prior to loading into a camera. After portion 158, track 156 comprises a short portion 160 which extends essentially parallel to, but at a distance from, the same one edge of the strip. After portion 160, track 156 comprises a long portion 136 which extends diagonally across the strip. So that the presence of track 156 will not interfere with development of images on photographic filmstrip 12, the ink may be made soluble in a wash solution to be applied prior to or during development.

In operation of the embodiment of FIG. 13, portion 158 is left extended from the cartridge at assembly. Thus, a magnet on portion 154 is attracted to track 156 and holds pointer 150 with its tip spaced from "Load." Thus, the user can see that the film is unexposed. When strip 12 has been withdrawn from the cartridge sufficiently far for proper loading into a camera, the magnet follows track 156 onto portion 160 and thus swings pointer 150 until it points to "Load." As exposures are made, the magnet follows portion 162 and swings pointer from indicium "24" toward indicium "0". When strip 12 is wound back into the cartridge, the process reverses. An anti-reverse mechanism of the type previously described may be provided for holding the pointer at indicium "0" as track 156 moves back into the cartridge.

Figure 14:
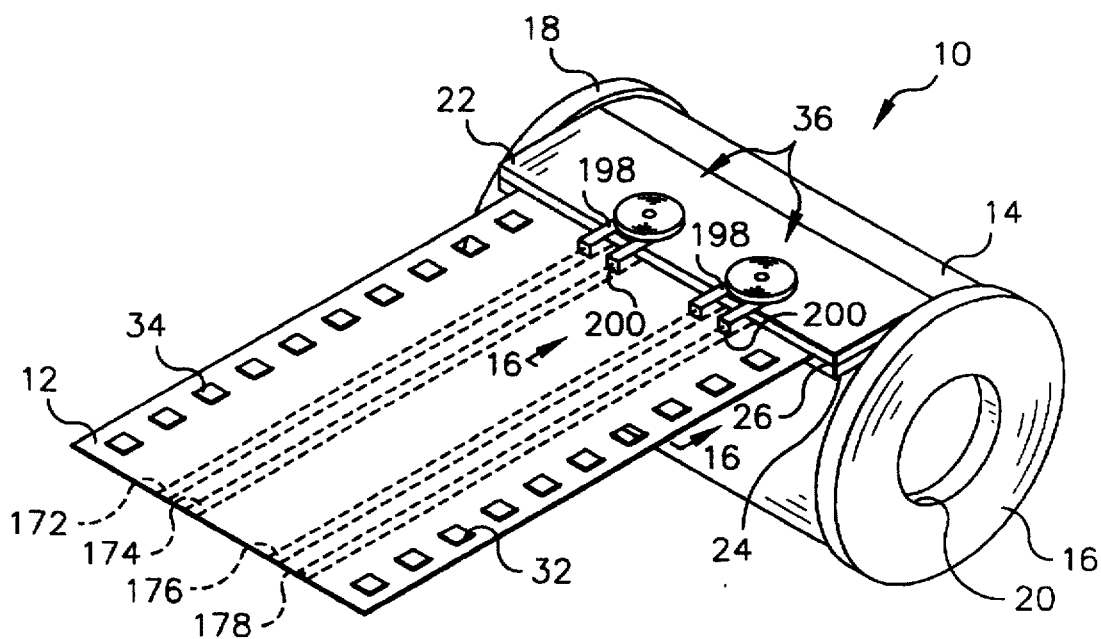
FIG. 14 shows a perspective view of a cartridge embodying a fifth embodiment of a magnetically actuated, visual status indicator in accordance with the invention.
Figure 15:
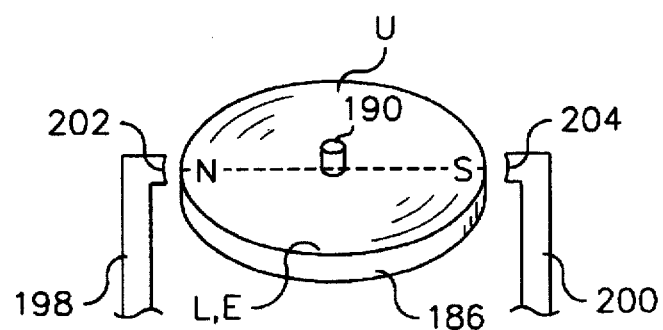
FIG. 15 shows an enlarged perspective view of the bi-stable indicator member of the embodiment of FIG. 14.
Figure 16:
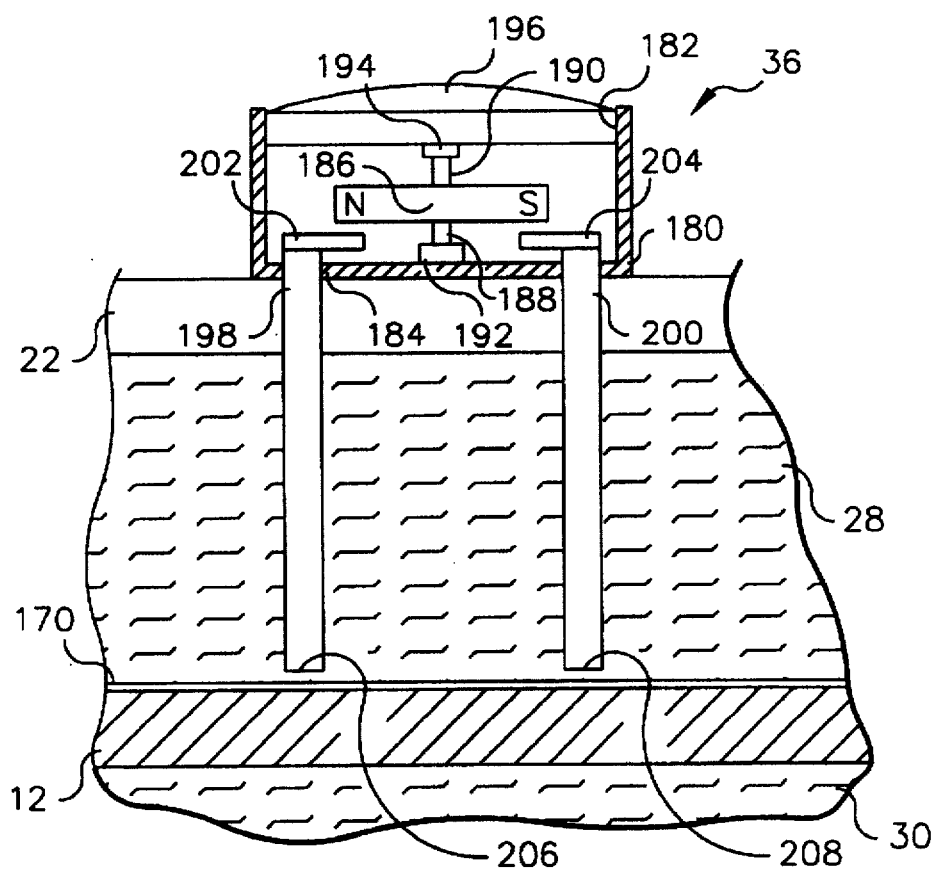
FIG. 16 shows a sectional view along line 16—16 of FIG. 14.
Figure 17A:
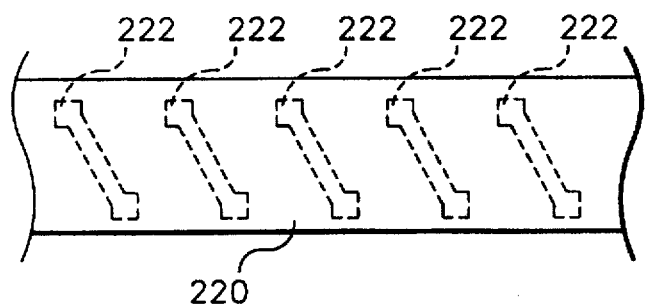
FIGS. 17A to 17D show plan views of lamination layers used to make a ferromagnetic flux conductor for the embodiments of FIGS. 14, 21, and 23.
Figure 17B:
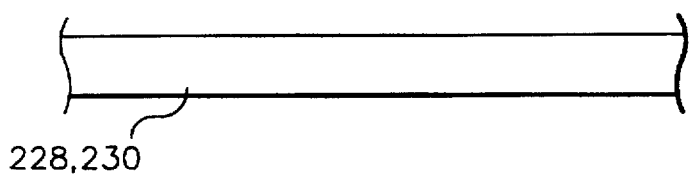
Figure 17C:
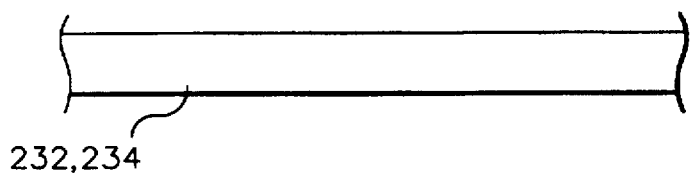
Figure 17D:
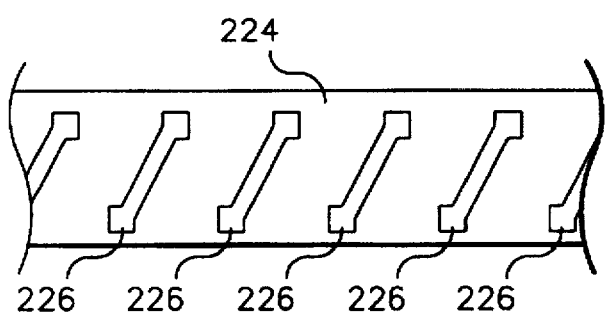
Figure 17E:
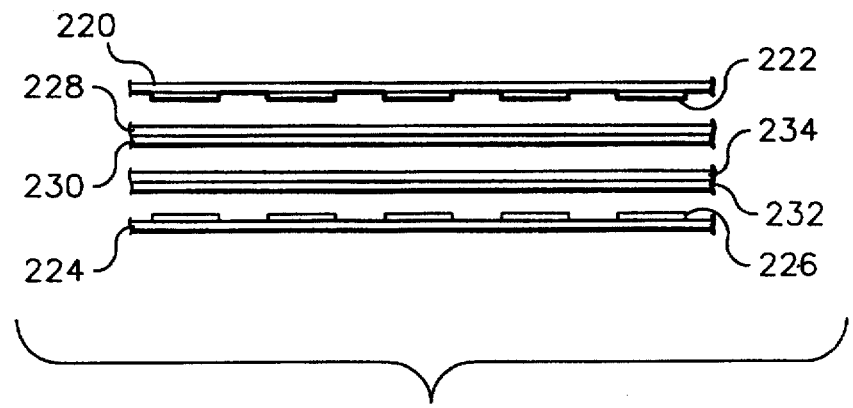
FIG. 17E shows an exploded view of the layers of FIGS. 17A to 17D prior to lamination.

FIGS. 14 to 16 show features of a fifth embodiment of indicator 36. Here, a layer 170 of conventional transparent magnetic recording medium is coated onto the back side of strip 12. In the illustrated embodiment, two pairs of magnetic recording tracks 172, 174; 176, 178 extend along strip 12, each pair being associated with a single indicator 36, as shown schematically in FIG. 14. However, in view of the following description of this embodiment, those skilled in the art will appreciate that a larger number of indicators, in a linear or area array, and a correspondingly larger number of pairs of recording tracks, could be used. Each indicator comprises a cylindrical frame 180 including an opening 182 and a bottom wall 184. Preferably, frame 180 is mounted on the upper surface of lip 22. Within the frame is mounted a bi-stable indicator member 186, which may be a circular disk of magnetic material poled to have diametrically separated N, S poles as shown in FIG. 15. For example in the illustrated case where two indicators 36 are used, the upper surface of member 186 may be provided with indicia U and L for one indicator and U and E for the other. A pair of coaxial stub shafts 188, 190 extend from member 186 along an axis essentially perpendicular to the plane of strip 12. A plain bearing 192 on bottom wall 184 rotatably supports shaft 188, while shaft 190 is supported by a plain bearing 194 on an under side of a transparent cover or lens 196. A mask, not illustrated, may be provided above the lens; so that, only one of indicia U, E can be seen at a time. A pair of ferromagnetic flux conductors 198,200 extends between indicator member 186 and a corresponding pair of tracks 172–178. One pair of ends 202, 204 of the flux conductors extends radially beneath, as shown, or above member 186 and in close proximity to the surface of member 186. A clearance of about 0.001 inch would provide good magnetic coupling. Another pair of ends 206, 208 are positioned with about the same clearance to tracks 172, 174, for example. An anti-reversing mechanism of the type previously described may be provided to prevent member 186 from rotating when strip 12 is inserted back into the cartridge.

Figure 18:
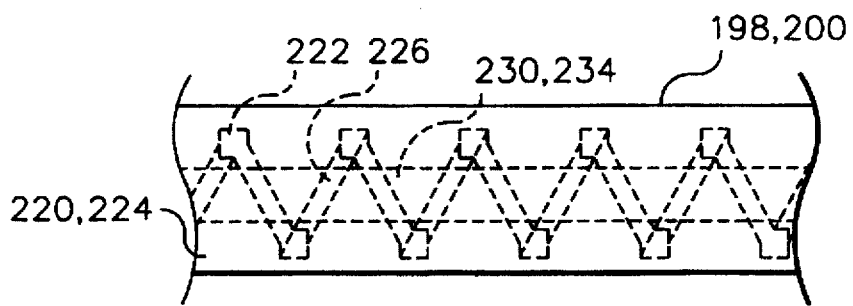
FIG. 18 shows a plan view of a laminated flux conductor.

As strip 12 is moved out of the cartridge, magnetic signals previously recorded on tracks 172, 178 induce further signals which are transmitted along flux conductors 198,200 to cause indicator member 186 to switch positions. For example, the magnetic signals may be provided in the form of a series of binary bit sets. Because the signals recorded on the tracks typically will be small in magnetic strength, flux conductors 198,200 are specially configured for inductively transmitting the signals to ends 202, 204. FIGS. 17A–E and 18 show a suitable laminated, flat inductive coil structure for the flux conductors, to pick up signals from the magnetic tracks and provide adequate magnetic fields of opposite polarity at ends 202, 204 to cause the bi-stable element to switch positions. A first strip 220 of electrically insulating material, such as Mylar, supports an array of axially spaced, first half coil turns 222 of an electrical conductor such as copper. Turns 222 may be deposited using familiar photo-masking and sputtering techniques, or the like. On the opposite side of the lamination, a second strip 224 of electrically insulating material supports a complementary array of axially spaced, second half coil turns 226 also of an electrical conductor. The ends of half coil turns 222, 226 are positioned such that when conductor is laminated, the ends come into intimate electrical contact and a flat coil is formed, as shown in FIG. 18. Between the half coil turns are located a third strip 228 and a fourth strip 232 of electrically insulating material, on opposing surfaces of which are deposited layers 230, 234 of ferromagnetic material such as iron. Preferably, layers 230, 234 extend to less than the full width of strips 228, 232 to provide suitable clearance for electrical insulation between the iron and coil turns 222, 226. The strips are assembled for lamination in the order shown in FIG. 17E and laminated to produce the flat inductive coil structure of FIG. 18, using suitable adhesives or by thermally joining the insulating layers. In the completed flat coil structure, the half coil turns are electrically connected; so that, the completed coil wraps around a central ferromagnetic core formed by layers 230, 234. The resultant structure can be flexed and bent as needed to form flux conductors 198,200.

In operation of the embodiment of FIGS. 14 to 16, the two indicators 36 are assembled to the cartridge with the U indicia visible to the user. Tracks 172, 174 and 176, 178 are previously recorded with magnetic signals at locations corresponding to a length of strip 12 which has been extended from the cartridge. For example, the initial portions of the tracks would have no signals recorded; so that, both indicators would display the indicium U for unexposed film. At an extended length corresponding to proper loading of the film into a camera, tracks 172, 174 would be recorded with opposite polarity signals to cause their associated indicator to switch position and display the indicium L for loaded film. In contrast, tracks 176, 178 would have no signals recorded; so that, their associated indicator would continue to display the indicium U. The combination of L, U would indicate to the user that the film has been properly loaded and includes at least some unexposed frames. From the position corresponding to proper loading of the film to a later position just after the last frame to be exposed, both pairs of tracks would have no signals recorded; so that, the combination L, U would continue to be displayed as exposures are made. After the last frame, tracks 172, 174 would continue to have no signals recorded; so that, their indicator would continue to display the indicium L. But, tracks 176, 178 would be recorded with opposite polarity signals to cause their associated indicator to switch positions and display the indicium E for exposed film. The combination of L, E would indicate to the user that the film has been fully exposed. Those skilled in the art will appreciate that additional indicators could be used to provide different combinations of indicia. For example, a linear array of indicators could be used to provide a display which changes more frequently as the film is indexed through a camera.

Figure 19:
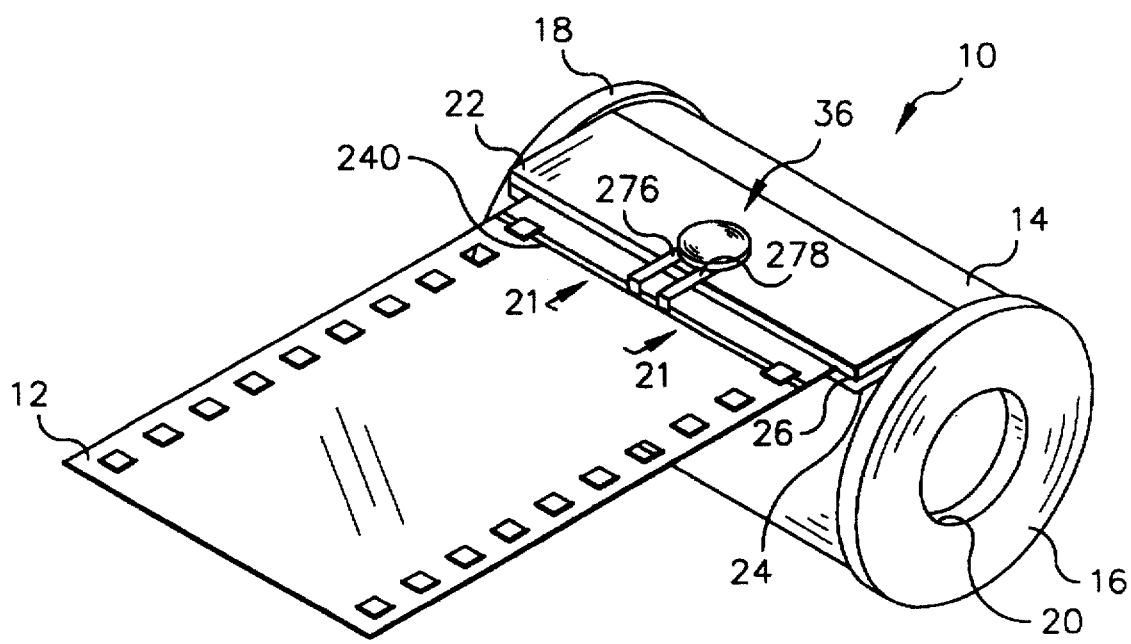
FIG. 19 shows a perspective view of a cartridge embodying a sixth magnetically actuated, visual status indicator in accordance with the invention.
Figure 20:
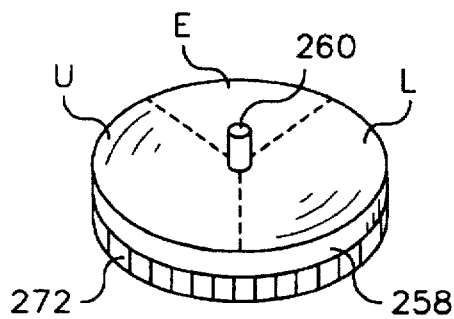
FIG. 20 shows a perspective view of the indicator member or disk of the embodiment of FIG. 19.
Figure 21:
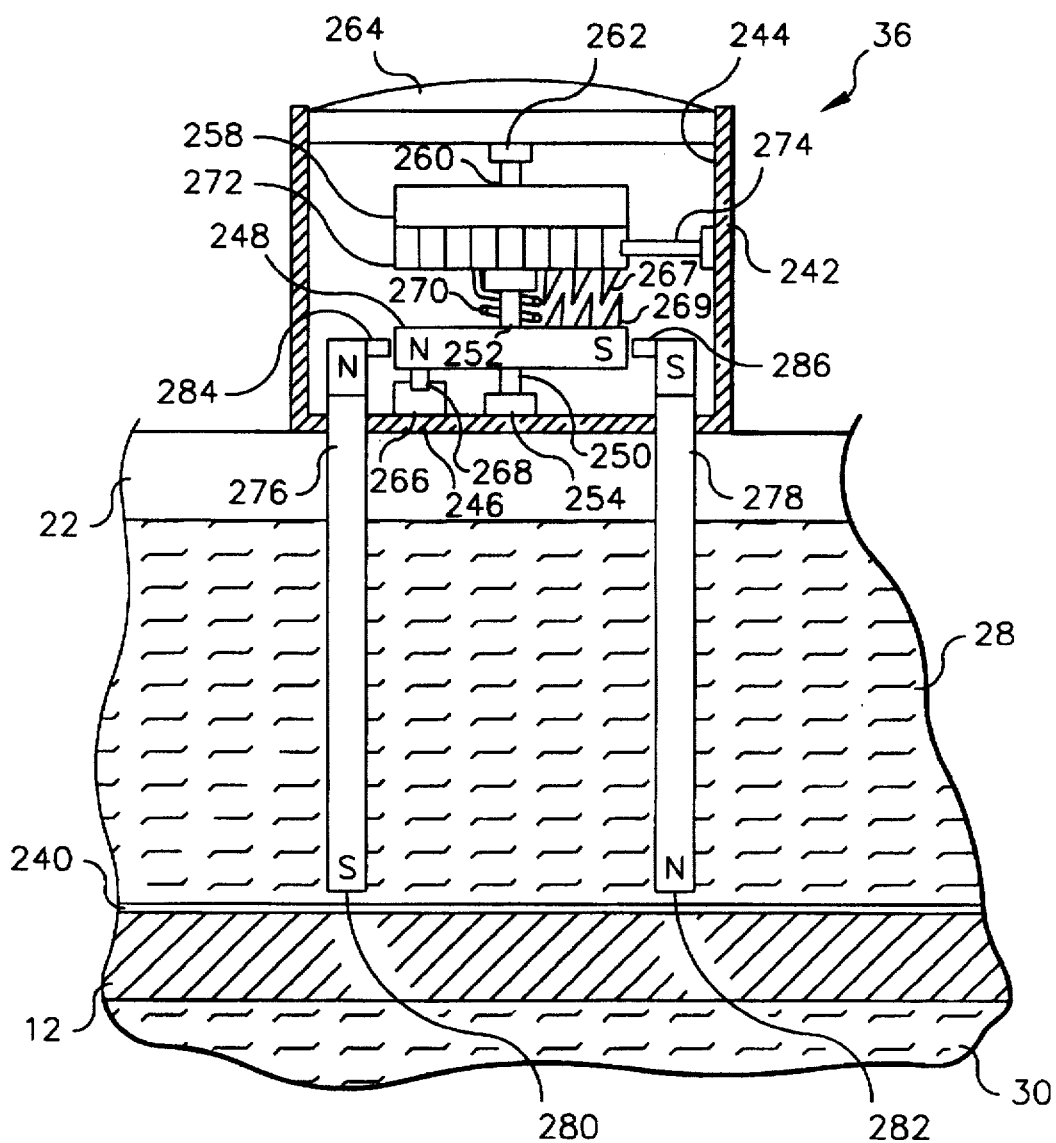
FIG. 21 shows a view along line 21—21 of FIG. 19.

FIGS. 19 to 21 show features of a sixth embodiment of indicator 36. In this instance, strip 12 is provided with at least one discrete transverse stripe or track 240 of magnetic material, such as the material used in the embodiment of FIG. 11. Alternatively, track 240 could be replaced by short, oppositely poled patches of the same material, located to be opposite a pair of flux conductors to be described shortly. The indicator could be the same as that of FIG. 16, if desired. As shown in FIGS. 20 and 21, however, the sixth embodiment comprises a cylindrical frame 242 having an upper opening 244 and a bottom wall 246. Within the frame, a magnetic disk 248 has a pair of coaxial stub shafts 250, 252. A plain bearing 254 on bottom wall 246 supports shaft 250, while shaft 252 is supported by a plain bearing 256 on an under side of an indicator disk 258. A stub shaft 260 extends upward from disk 258 and is supported by a plain bearing 262 on an under side of a transparent cover of lens 264. As shown in FIG. 20, an upper surface of the indicator disk may be provided with indicia U, L, and E or other suitable indicia. A mask, not shown, may be provided above the lens; so that, only one indicium will be visible at a time. A stop 266 extends upwardly from bottom wall 246 to engage an axial projection 268 on an under side of magnetic disk 248, thereby providing a rotational stop for disk 248. A torsion spring 270 is positioned around stub shaft 252 and is connected at one end to one of magnetic disk 248 and indicator disk 258. The other end of torsion spring 270 is abuts one of a series of ratchet stops, not illustrated, on the other of magnetic disk 248 and indicator disk 258. Thus, the two disks are resiliently coupled for rotation. On an under side of disk 258 is provided a circumferentially extended set of ratchet teeth 267, only a portion of which are shown. Teeth 267 mesh with a corresponding set of ratchet teeth 269 provided on an upper side of disk 248, only a portion of teeth 269 being shown. An anti-reverse ratchet 272 is provided on a peripheral surface of indicator disk 258 and is engaged by a flexible, radial pawl 274 extended from frame 242. A pair of ferromagnetic flux conductors 276, 278, which comprise the flat inductive coil structure of flux conductors 198,200, have ends 280, 282 in close proximity to track 240 and ends 284, 286 in close proximity to magnetic disk 248.

In operation of the embodiment of FIGS. 19 to 21, indicator 36 is assembled to the cartridge with indicium U visible to the user. A first magnetic track 240 or a pair of spaced, oppositely poled patches, not shown, is positioned on strip 12 at an extended length corresponding to proper loading of the film into a camera. When this first track moves beneath flux conductors 276, 278, magnetic fields S, N on the track induce opposite polarity fields N, S at ends 284, 286 of the flux conductors, which repel the fields of magnetic disk 248, causing it to rotate projection 268 away from stop 266. This rotation engages ratchet teeth 267,269 and applies torsion to spring 270, which is coupled to indicator disk 258, causing disk 258 to rotate in the same direction until indicium L becomes visible. When the magnetic track has passed, ratchet teeth 267,269 slip past each other as magnetic disk 248 rotates in reverse under the influence of spring 270, until projection 268 encounters stop 266. Pawl 274 and ratchet 272 prevent reverse rotation of indicator disk 258. A second magnetic track 240, not shown, is positioned on strip 12 just after the last frame to be exposed. When this second track is encountered by flux conductors 276, 278, indicator disk again is rotated and indicium E becomes visible.

Figure 22:
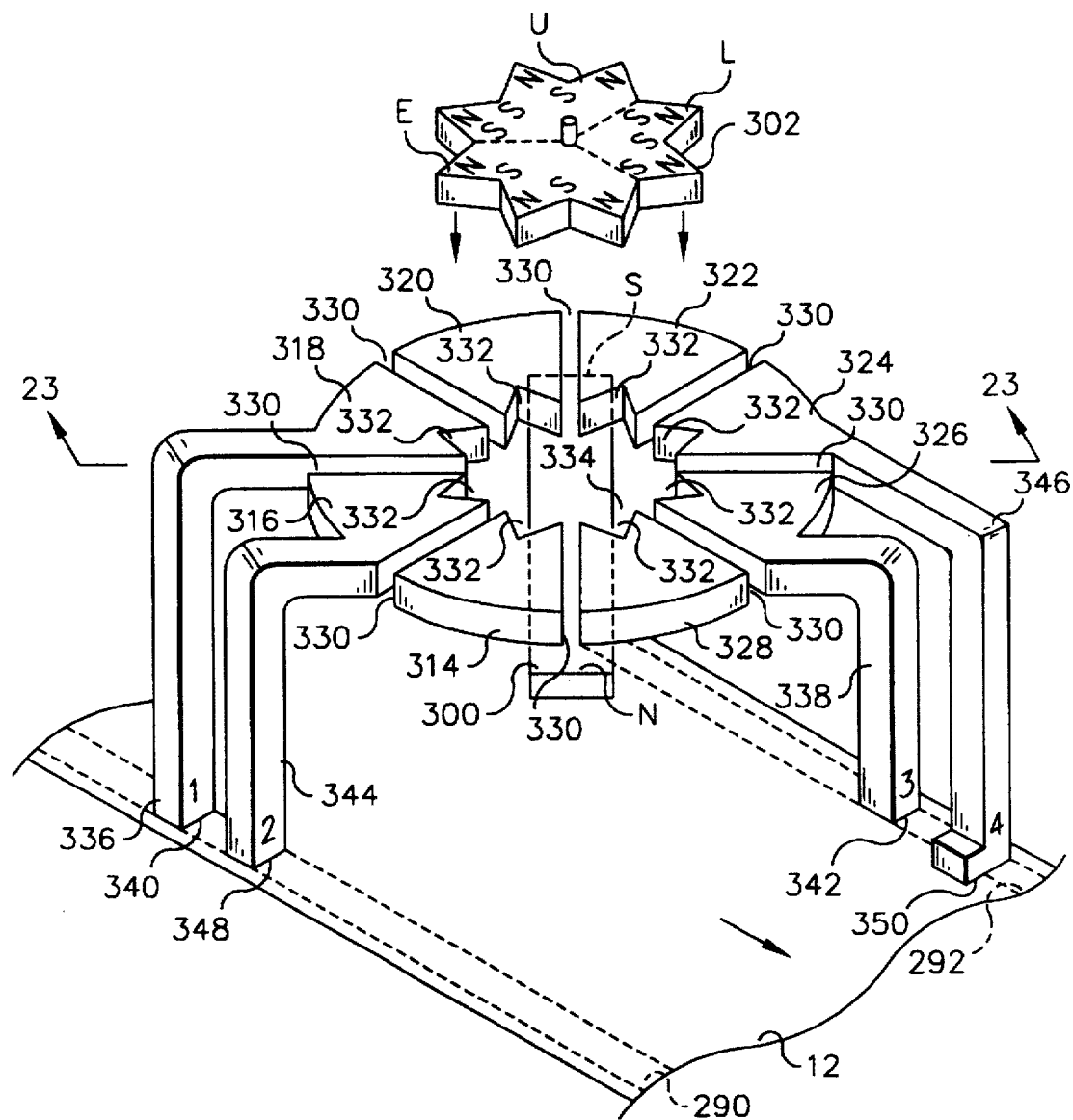
FIG. 22 shows a simplified, partially exploded, perspective view of a seventh embodiment of a magnetically actuated, visual status indicator in accordance with the invention.
Figure 23:
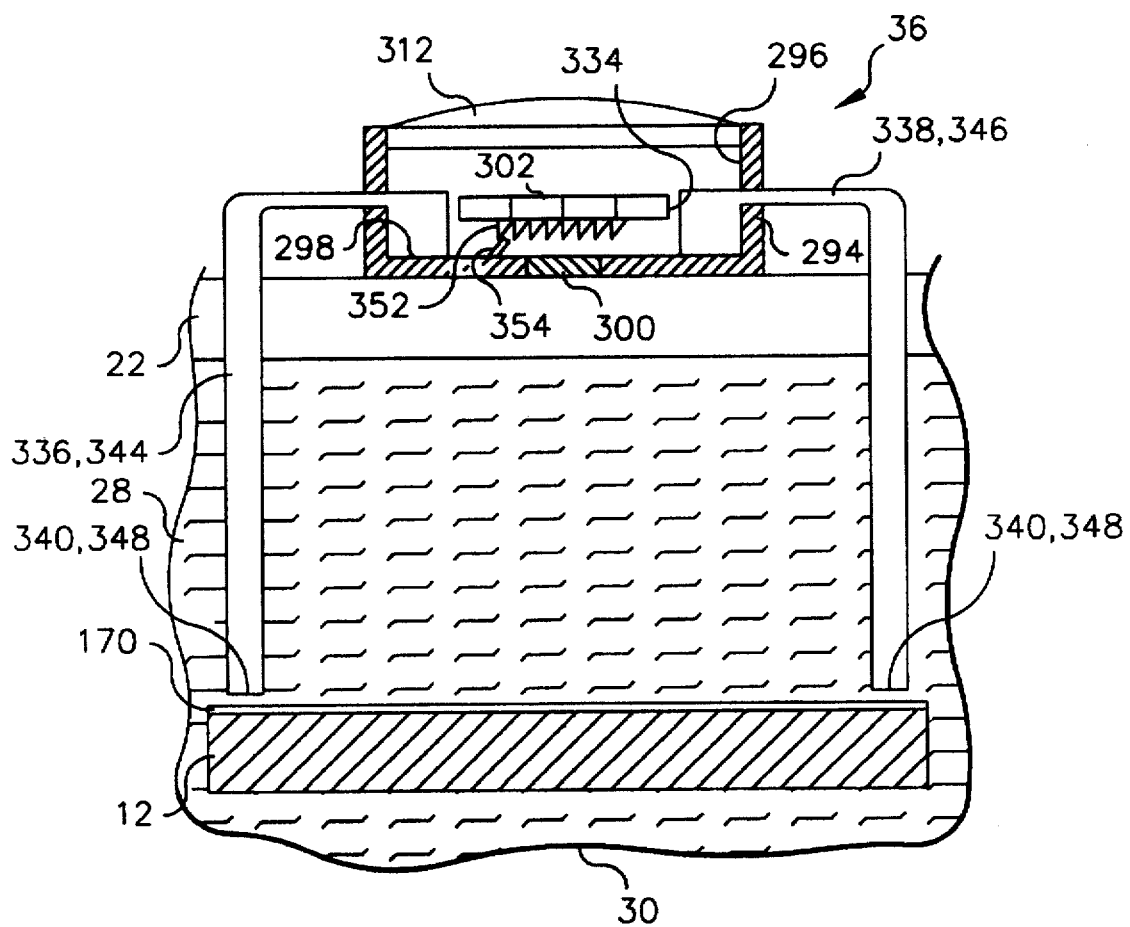
FIG. 23 shows a sectional view of the embodiment of FIG. 22, as installed in a cartridge.
Figure 24:
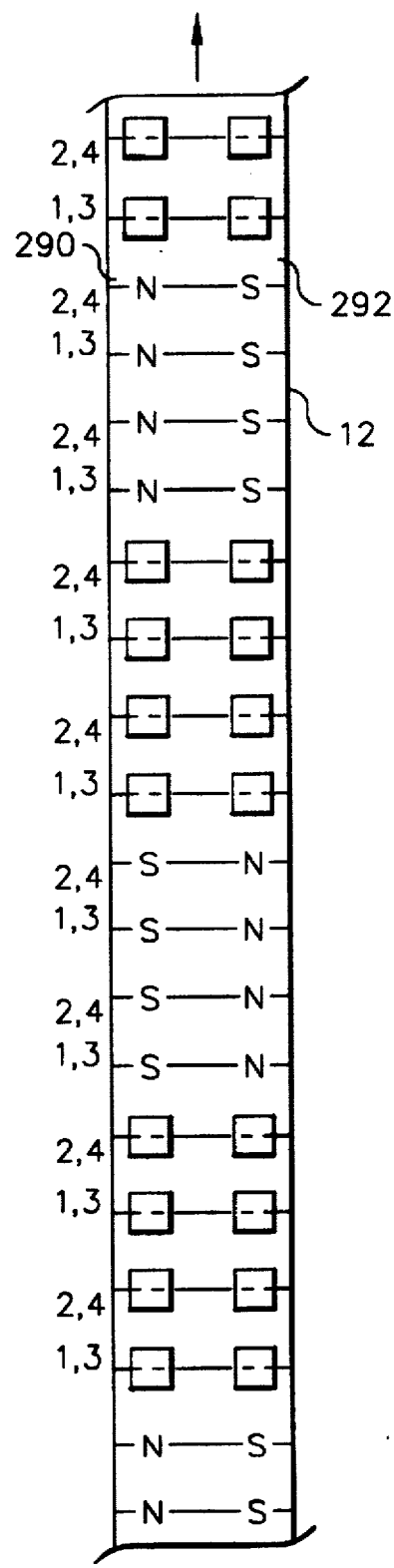
FIG. 24 shows schematically an arrangement of magnetized and blank zones on a filmstrip to be used with the embodiment of FIGS. 22 and 23.

FIGS. 22 to 24 show features of a seventh embodiment of indicator 36. Strip 12 again is provided with layer 170 of transparent magnetic recording medium. Preferably along the edges of the strip, but optionally at any location across the strip, longitudinally extended magnetic tracks 290, 292 are provided. In this embodiment, a cylindrical frame 294 includes an upper opening 296 and a bottom wall 298. A permanent magnet 300 is embedded in bottom wall 298 or may be mounted on an upper surface thereof, not illustrated. A magnetic indicator gear wheel is positioned on bottom wall 298. A transparent cover or lens 312 closes frame 294. Gear wheel 302 is essentially free-floating, to accommodate an eccentric rotation of the indicator gear wheel to be described shortly. Indicator gear wheel 302 may made from a suitable magnetizable material, such as the plastic used for magnet 44 of the embodiment of FIG. 3. A illustrated, the gear wheel is symmetrical and includes six radially extended teeth which at their tips are poled N and at their roots are poled S, thereby providing alternating N, S poles around the gear wheel. Those skilled in the art will appreciate, however, that the number of teeth is arbitrary. The upper surface of gear wheel 302 may bear indicia U, L, and E as shown in FIG. 22. Or, the gear wheel may include open or transparent sectors through which indicia on bottom wall 298 may be viewed. A mask, not illustrated, may be provided above lens 312; so that, only one of the indicia is visible at a time.

Surrounding gear wheel 320 and supported on bottom wall 298 are a plurality of stator sectors 314, 316, 318,320, 322, 324, 326 and 328 made of ferromagnetic material. The stator sectors are separated by small radial air gaps 330. Each stator sector includes a central notch 332 which faces radially inwardly toward gear wheel 320. The stator sectors are arranged in an essentially circular array, thereby defining a toothed opening 334 having a plurality, such as the illustrated eight, teeth. Each tooth is defined by portions of a pair of adjacent stator sectors on opposite sides of an air gap 330. While the illustrated embodiment provides two more teeth in opening 334 than on gear wheel 302, proper rotation of the gear wheel can be achieved if opening 334 has at least one more tooth than the gear wheel. A pair of ferromagnetic flux conductors 336, 338 (also numbered 1 and 3 to correspond to FIG. 24) extend from stator sectors 318 and 326, respectively, and have lower ends 340, 342 positioned in close proximity to magnetic tracks 290, 292, respectively. A further pair of ferromagnetic flux conductors 344, 346 (also numbered 2 and 4 to correspond to FIG. 24) extend from stator sectors 316 and 324, respectively, and have lower ends 348, 350 positioned in close proximity to magnetic tracks 290, 292, respectively. End 340 is positioned ahead of end 348 on track 290 and end 342 is positioned ahead of end 350 on track 292. Flux conductors 336,338, 344, 346 preferably comprise the flat inductive coil structure of flux conductors 198,200. An anti-reverse ratchet is provided on an under side of gear wheel 320 and is engaged by a flexible pawl 354 extended from bottom wall 298.

In operation of the embodiment of FIGS. 22 to 24, indicator 36 is mounted on lip 22 with indicia U visible to the user. Magnet 300 would cause gear wheel 302 to assume a sort of detent position in opening 334 near the S pole of magnet 300, whenever the film is not moving. At an extended length of strip 12 corresponding to proper loading of the film into a camera, signals would be previously recorded onto tracks 290, 292 following a pattern such as that of FIG. 24. Prior to the illustrated pattern, strips 290, 292 would have no signals recorded, as illustrated by the blank spaces or boxes at the top of FIG. 24. Then, track 290 would have a series (four as illustrated) of signals of N polarity and track 292 would have an equal series of signals of S polarity. Then both tracks would have equal series of no signals (four as illustrated by blank spaces or boxes). Then, track 290 would have a series (four as illustrated) of signals of S polarity and track 292 would have an equal series of signals of N polarity. After an equal series of no signals, the pattern would then repeat. Each series of sixteen blanks and signals as in FIG. 24 would index the gear wheel by one tooth.

As a pattern of signals indicating proper loading approaches the indicator, the ends 1, 2, 3, 4 of the flux conductors would be exposed to the pattern of blank spaces and signals with N or S polarities, as illustrated in FIG. 24. As a given flux conductor is exposed to a given polarity on one of tracks 290, 292, the stator sector at the other end of the flux conductor will exhibit the opposite polarity. So, when the first pattern of N, S signals is encountered on tracks 290, 292, respectively, during loading of the film into a camera, diametrically opposite stator sectors 318,326 will be induced to exhibit S and N polarities, respectively, for four successive steps. Next, adjacent stator sectors 316, 324 then will be induced to exhibit S and N polarities, respectively for four successive steps. Thus, S and N polarities are established briefly at pairs of stator sectors 316, 318 and 324, 326 on opposite sides of opening 334. The field strengths should be several times stronger than that of permanent magnet 300. With a brief time delay, the intermediate stator sectors 320, 322 and 314, 328 will be induced to exhibit corresponding N, S polarities across gaps 330. These polarities will cause gear wheel 302 to roll eccentrically counter-clockwise along the perimeter of opening 334. As flux conductors 336, 338 encounter the first series of blank spaces, the S, N polarities will decay at stator sectors 318,326 but will remain briefly at stator sectors 316, 324, thus causing continued rolling of gear wheel 302. Eventually, as the flux conductors encounter the first pattern of S, N signals on tracks 290, 292, respectively, diametrically opposite stator sectors 318,326 will be induced to exhibit N and S polarities, respectively, for four successive steps; and stator sectors 316, 324 will be induced to exhibit the same polarities. At this point, gear wheel 302 will have rolled one full tooth along opening 334. Thus, as strip 12 moves along, the polarities around opening 334 will step along in a counter-clockwise direction, causing gear wheel to roll along until an extended series of blank series is encountered. When all of the flux conductors are exposed to blank spaces or the film stops, gear wheel 302 will be moved to the detent position by magnet 300, with the L indicium visible to the user. In the illustrated embodiment, approximately six cycles of the pattern of signals and blanks shown in FIG. 24 will cause a full revolution of gear wheel 302. At about the last frame to be exposed, a further pattern of blank spaces and N or S polarities, not illustrated, would be recorded on strip 12 to cause gear wheel 302 to move from the detent position and roll until the E indicium becomes visible. Ratchet 352 and pawl 354 would prevent reverse rotation when strip 12 is wound back into the cartridge.

| Parts List | |
|---|---|
| 10 cartridge | 20 opening or access to spool |
| 12 strip or sheet of web material | 22, 24 parallel lips on 14 |
| 14 hollow cartridge body or shell | 26 exit slit |
| 16, 18 end caps | 28, 30 strips of velvet plush |
| 32, 34 perforations | 108 first side of 100, 102, 104 to show E |
| 36 magnetically actuated visual indicator | 110 second side of 100, 102, 104 to show L |
| 38 first magnetic member | 112 surface of 98 between 100, 102, 104 to show U |
| 40 second magnetic member | |
| 42 annular rectangular frame | 114, 116, 118 deposits of magnetic material on 100, 102, 104 |
| 44 parallelepiped magnet | |
| 45 bottom wall | 120 magnetic member to show 110 |
| 46, 48 coaxial stub shafts | 122 magnetic member to show 108 |
| 50, 52 plain bearings in 42 | 130 discrete magnetic stripe or track |
| U indicium for unexposed film | 132 first portion of 130 for U |
| L indicium for loaded film | α distance of 132 from edge of 12 |
| E indicium for exposed film | 134 second portion of 130 for L |
| B blank side of 44 | 136 third portion of 130 for E |
| N, S magnetic poles of 44 | 138 indicator pointer or member |
| 54 transparent cover or lens | 140 pivot for 138 |
| 56 opening through 22 and 28 | 141 mounting base for 140 |
| 58 ratchet teeth | 142 tip of 138 |
| 60 anti-reverse pawl | 144 transverse portion of 138 |
| 62 cylindrical frame | 146 magnet |
| 64 opening | 148 end of 144 |
| 66 bottom wall | 150 frame number indicator pointer or member |
| 68 indicator member or disk | |
| 70, 72 coaxial stub shafts on 68 | 152 pivot |
| 74 plain bearing in 66 | 154 transverse portion |
| 76 plain bearing in under side of 78 | 156 discrete magnetic stripe or track |
| 78 transparent cover or lens | 158 first portion of 156 for U |
| 80, 82, 84 strips or bars of magnetic material | 160 second portion of 156 for L |
| | 162 third portion of 156 for frame count or E |
| 90 annular rectangular frame | |
| 92 opening | 170 layer of magnetic recording medium on 12 |
| 94 bottom wall | |
| 96 transparent cover or lens | 172, 174; 176, 178 pairs of magnetic recording tracks |
| 98 substrate | |
| 100, 102, 104 flexible vanes or members | 180 cylindrical frame |
| 106 tip of 100, 102 or 104 | 182 opening |

Parts List -continued

| | | | |
|---|---|---|---|
| 186 | bi-stable indicator member or disk | 184 | bottom wall |
| 188, 190 | coaxial stub shafts | 262 | plain bearing on under side of 264 |
| 192 | plain bearing on 184 | 264 | transparent cover or lens |
| 194 | plain bearing on under side of 196 | 266 | stop on 246 |
| 196 | transparent cover or lens | 267 | ratchet teeth on 258 |
| 198, 200 | ferromagnetic flux conductors | 268 | projection on under side of 248 |
| 202, 204 | ends near periphery of 186 | 269 | ratchet teeth on 248 |
| 206, 208 | ends near tracks in 170 | 270 | torsion spring coupling 248, 258 |
| 220 | first strip of electrically insulating material | 272 | anti-reverse ratchet on 258 |
| 222 | first half coil turns | 274 | radial pawl on 242 |
| 224 | second strip of electrically insulating material | 276, 278 | ferromagnetic flux conductors |
| 226 | second half coil turns | 280, 282 | ends near 240 |
| 228 | third strip of electrically insulating material | 284, 286 | ends near 248 |
| 230 | first layer of ferromagnetic material | 290, 292 | magnetic tracks on 12 |
| 232 | fourth strip of electrically insulating material | 294 | cylindrical frame |
| 234 | second layer of ferromagnetic material | 296 | opening |
| 240 | discrete transverse stripe or track of magnetic material | 298 | bottom wall |
| 242 | cylindrical frame | 300 | weak permanent magnet |
| 244 | opening | 302 | magnetic indicator gear wheel |
| 246 | bottom wall | 312 | transparent lens or cover |
| 248 | magnetic disk | 314–328 | stator sectors of magnetic material |
| 250, 252 | stub shafts | 330 | radial air gaps between 314–328 |
| 254 | plain bearing in 246 | 332 | central notch in each of 314–328 |
| 256 | plain bearing on under side of 258 | 334 | toothed opening |
| 258 | indicator disk | 336, 338 | stationary ferromagnetic flux conductors |
| 260 | stub shaft | 340, 342 | ends of 336, 338 at 290, 292 |
| | | 344, 346 | stationary ferromagnetic flux conductors |
| | | 348, 350 | ends of 344, 346 at 290, 292 |
| | | 352 | anti-reverse ratchet on under side of 302 |
| | | 354 | pawl on 298 |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A cartridge of web material, comprising:

a hollow cartridge body having an exit slit;

a strip or sheet of web material enclosed in said cartridge body to be withdrawn from or inserted into said cartridge body via said exit slit;

at least one magnetic member carried on said strip or sheet; and a magnetically actuated visual indicator mounted on said cartridge body adjacent said exit slit to be actuated by said magnetic member when said strip or sheet is withdrawn from or inserted into said cartridge body.

2. A cartridge according to claim 1, wherein said magnetically actuated indicator also is actuated when said strip or sheet is inserted into said cartridge body.

3. A cartridge according to claim 1, wherein said magnetically actuated indicator comprises:

a frame supported on said cartridge body;

a magnet supported by said frame for rotation about an axis;

a first indicium on said magnet for showing a first status of said strip or sheet;

a second indicium on said magnet for showing a second status of said strip or sheet; and an opening in said frame through which one of said indicia is visible externally of said indicator, whereby movement of said magnetic member past said magnet causes said magnet to rotate from a first position revealing said first indicium through said opening, to a second position revealing said second indicium.

4. A cartridge according to claim 3, wherein said axis is transverse to a direction of movement of said strip or sheet through said exit slit.

5. A cartridge according to claim 3, wherein said axis is parallel to a direction of movement of said strip or sheet through said exit slit.

6. A cartridge according to claim 1, wherein said web material is a light-sensitive, photographic medium and there are first and second magnetic members spaced along said strip or sheet; and said magnetically actuated indicator comprises:

a frame supported on said cartridge body;

a magnet supported by said frame for rotation about an axis;

a first indicium on said magnet for showing an Unexposed status of said photographic medium;

a second indicium on said magnet for showing a Loaded status of said photographic medium;

a third indicium on said magnet for showing an Exposed status of said photographic medium; and an opening in said frame through which one of said indicia is visible externally of said indicator, whereby movement of said first magnetic member past said magnet causes said magnet to rotate from a first position revealing said Unexposed indicium through said opening, to a second position revealing said second Properly Loaded indicium; and movement of said second magnetic member past said magnet causes said magnet to rotate from said second position to a third position revealing said Exposed indicium.

7. A cartridge according to claim 6, further comprising a mechanism for preventing rotation of said magnet when said photographic medium is inserted into said cartridge following exposure.

8. A cartridge according to claim 6, wherein said first and second magnetic members are of opposite polarity.

9. A cartridge according to claim 6, wherein said axis is transverse to a direction of movement of said strip or sheet through said exit slit.

10. A cartridge according to claim 6, wherein said axis is parallel to a direction of movement of said strip or sheet through said exit slit.

11. A cartridge according to claim 1, wherein said magnetically actuated indicator comprises:

a frame supported on said cartridge body;

an indicator member supported by said frame for rotation about an axis;

a member of soft magnetic material supported by said indicator member;

a first indicium on said indicator member for showing a first status of said strip or sheet;

a second indicium on said indicator member for showing a second status of said strip or sheet; and an opening in said frame through which one of said indicia is visible externally of said indicator, whereby movement of said magnetic member past said soft magnetic material causes said indicator member to rotate from a first position revealing said first indicium through said opening, to a second position revealing said second indicium.

12. A cartridge according to claim 11, wherein said axis is transverse to a direction of movement of said strip or sheet through said exit slit.

13. A cartridge according to claim 11, wherein said axis is parallel to a direction of movement of said strip or sheet through said exit slit.

14. A cartridge according to claim 11, wherein said indicator member is a disk with said first and second indicia on one side thereof.

15. A cartridge according to claim 1, wherein said web material is a light sensitive photographic medium; there are first and second magnetic members spaced along said strip or sheet; and said magnetically actuated indicator comprises:

a frame supported on said cartridge body;

an indicator member supported by said frame for rotation about an axis;

first and second members of soft magnetic material supported by said indicator member at locations spaced around said axis;

a first indicium on said indicator member for showing an Unexposed status of said photographic medium;

a second indicium on said indicator member for showing a Loaded status of said photographic medium;

a third indicium on said indicator member for showing an Exposed status of said photographic medium; and an opening in said frame through which one of said indicia is visible externally of said indicator, whereby movement of said first magnetic member past said first member of soft magnetic material causes said indicator member to rotate from a first position revealing said Unexposed indicium through said opening, to a second position revealing said Properly Loaded indicium; and movement of said second magnetic member past said second member of soft magnetic material causes said indicator member to rotate from said second position to a third position revealing said Exposed indicium.

16. A cartridge according to claim 15, wherein said axis is transverse to a direction of movement of said strip or sheet through said exit slit.

17. A cartridge according to claim 15, wherein said axis is parallel to a direction of movement of said strip or sheet through said exit slit.

18. A cartridge according to claim 15, wherein said indicator member is a disk with said first, second, and third indicia on one side thereof.

19. A cartridge according to claim 15, further comprising a mechanism for preventing rotation of said indicator member when said photographic medium is inserted into said cartridge following exposure.

20. A cartridge according to claim 1, wherein said web material is a light sensitive photographic medium; and said indicator comprises:

a substrate;

a plurality of flexible members extended from said substrate, each flexible member having a tip and first and second sides on opposite sides of said tip, said flexible members being spaced from each other along said substrate;

a corresponding plurality of deposits of magnetic particles, one deposit on said tip of each of said flexible members;

a first indicium on said substrate between said flexible members for showing a first status of said photographic medium; and a second indicium on said first side of each flexible member for showing a second status of said photographic medium, whereby movement of said magnetic member past said flexible members causes said flexible members to flex from a first position revealing said first indicium, to a second position revealing said second indicium.

21. A cartridge according to claim 20, wherein there are first and second magnetic members; said first indicium shows an Unexposed status; and said second indicium shown a Loaded status, further comprising:

a third indicium on a second side of each flexible member for showing an Exposed status of said photographic medium, whereby movement of said first magnetic member past said flexible members causes said flexible members to flex from a first position revealing said first indicium, to a second position revealing said second indicium; and movement of said second magnetic member past said flexible members causes said flexible members to flex from said first position to a third position revealing said third indicium.

22. A cartridge according to claim 20, wherein said first and second magnetic members are of opposite polarity, whereby said flexible members flex in respective opposite directions.

23. A cartridge according to claim 20, further comprising a frame surrounding said substrate and flexible members and a lens mounted in said frame to permit viewing of said indicia through said lens.

24. A cartridge according to claim 1, wherein:

said magnetic member comprises a magnetic track extended along said strip or sheet in a direction of withdrawal from said cartridge body, said track having first and second portions, said portions being located at first and second distances from a longitudinal edge of said strip or sheet; and said visual indicator comprises a pointer member, a pivot for said pointer member supported on said cartridge body, and a magnet supported on said pointer member and spaced from said pivot, said magnet being located opposite said magnetic track, whereby as said strip or sheet is withdrawn from said cartridge body, said magnet follows said magnetic track from said first portion to said second portion, thereby rotating said pointer member on said pivot to indicate changes in status of said strip or sheet.

25. A cartridge according to claim 24, wherein said first and second portions extend essentially parallel to said direction.

26. A cartridge according to claim 24, wherein said web material is a light sensitive photographic medium; said first portion corresponds to an Unexposed status of said medium; and said second portion corresponds to a Loaded status of said medium, further comprising:

a third portion of said magnetic track located at a third distance from said longitudinal edge, said third portion corresponding to an Exposed status of said medium, whereby said magnet follows said magnetic track from said first portion, to said second portion, to said third portion to indicate successively said Unexposed, Loaded and Exposed statuses of said medium.

27. A cartridge according to claim 24, further comprising a mechanism for preventing rotation of said flag member when said photographic medium is inserted into said cartridge following exposure.

28. A cartridge according to claim 1, wherein:

said magnetic member comprises a plurality of magnetic tracks extended along said strip or sheet parallel to a direction of withdrawal from said cartridge body; and said visual indicator comprises a corresponding plurality of magnetically actuated bi-stable elements supported on said cartridge body, and a corresponding plurality of ferromagnetic flux conductors extended between said tracks and said bi-stable elements, whereby, as said strip or sheet is withdrawn from said cartridge body, said bi-stable elements can change from a first to a second state in response to signals magnetically recorded on said tracks and transmitted to said bi-stable elements by said flux conductors.

29. A cartridge according to claim 28, wherein said web material is a light sensitive photographic medium; said first state of a first of said bi-stable elements corresponds to an Unexposed status of said medium; said second state of said first bi-stable element corresponds to a Loaded status of said medium; said first state of a second of said bi-stable elements corresponds to an Unexposed status of said medium; and said second state of said second bi-stable element corresponds to an Exposed status of said medium.

30. A cartridge according to claim 28, wherein said bi-stable elements are arranged in a linear array.

31. A cartridge according to claim 28, wherein said bi-stable elements are arranged in an area array.

32. A cartridge according to claim 28, wherein said flux conductors comprise inductive coils.

33. A cartridge according to claim 28, wherein said flux conductors comprise a central core of ferromagnetic material and a coil of electrically conductive material around said central core.

34. A cartridge according to claim 1, wherein said magnetic member comprises a magnetic stripe extended transverse to a direction of withdrawal from the cartridge body; and said magnetically actuated indicator comprises:

a frame supported on said cartridge body;

an indicator member supported by said frame for rotation about an axis;

a first indicium on said indicator member for showing a first status of said strip or sheet;

a second indicium on said indicator member for showing a second status of said strip or sheet;

an opening in said frame through which one of said indicia is visible externally of said indicator;

a magnet rotatably supported by said frame, said magnet being coupled to said indicator member; and a pair of ferromagnetic conductors, each having a first end positioned to influence said magnet and a second end positioned to be influenced by said magnetic stripe, whereby movement of said magnetic stripe past said second ends induces a magnetic flux at said first ends which causes said magnet and said indicator member to rotate from a first position revealing said first indicium through said opening, to a second position revealing said second indicium.

35. A cartridge according to claim 34, wherein said axis is transverse to a direction of movement of said strip or sheet through said exit slit.

36. A cartridge according to claim 34, wherein said indicator member is a disk with said first and second indicia on one side thereof.

37. A cartridge according to claim 34, wherein said magnet is coupled to said indicator member by a torsion spring, further comprising a stop for limiting reverse rotation of said magnet.

38. A cartridge according to claim 34, further comprising a mechanism for preventing rotation of said indicator member when said photographic medium is inserted into said cartridge following exposure.

39. A cartridge according to claim 34, wherein said flux conductors comprise inductive coils.

40. A cartridge according to claim 34, wherein said flux conductors comprise a central core of ferromagnetic material and a coil of electrically conductive material around said central core.

41. A cartridge according to claim 1, wherein said web material is a light sensitive photographic medium; said magnetic member comprises first and second magnetic stripes extended transverse to a direction of withdrawal from the cartridge body, said stripes being spaced along said strip or sheet; and said magnetically actuated indicator comprises:

a frame supported on said cartridge body;

an indicator member supported by said frame for rotation about an axis;

a first indicium on said indicator member for showing an Unexposed status of said photographic medium;

a second indicium on said indicator member for showing a Loaded status of said photographic medium;

a third indicium on said indicator member for showing an Exposed status of said photographic medium; and an opening in said frame through which one of said indicia is visible externally of said indicator;

a magnet rotatably supported by said frame, said magnet being coupled to said indicator member; and a pair of ferromagnetic conductors, each having a first end positioned to influence said magnet and a second end positioned to be influenced by said magnetic stripe, whereby movement of said first magnetic stripe past said second ends induces a magnetic flux at said first ends which causes said magnet and said indicator member to rotate from a first position revealing said Unexposed indicium through said opening, to a second position revealing said Loaded indicium; and movement of said second magnetic stripe past said second ends induces a magnetic flux at said first ends which causes said magnet and said indicator member to rotate from said second position to a third position revealing said Exposed indicium.

42. A cartridge according to claim 41, wherein said axis is transverse to a direction of movement of said strip or sheet through said exit slit.

43. A cartridge according to claim 41, wherein said indicator member is a disk with said first, second, and third indicia on one side thereof.

44. A cartridge according to claim 41, wherein said magnet is coupled to said indicator member by torsion spring, further comprising a stop for limiting reverse rotation of said magnet.

45. A cartridge according to claim 41, further comprising a mechanism for preventing rotation of said indicator member when said photographic medium is inserted into said cartridge following exposure.

46. A cartridge according to claim 1, wherein said magnetic member comprises a pair of magnetic tracks on said strip or sheet extended in a direction of withdrawal from said cartridge body; and said magnetically actuated indicator comprises:

a frame supported on said cartridge body;

an indicator wheel supported by said frame for rotation about an axis, said wheel having a first number of radially outwardly extended gear teeth, said gear teeth and spaces between said gear teeth having opposite magnetic polarities;

a first indicium on said indicator wheel for showing a first status of said strip or sheet;

a second indicium on said indicator wheel for showing a second status of said strip or sheet;

an opening in said frame through which one of said indicia is visible externally of said indicator;

a plurality of stator sectors supported by said frame around said indicator wheel, said stator sectors being circumferentially spaced from each other around a toothed opening having a second, greater number of radially inwardly extended gear teeth;

first and second ferromagnetic flux conductors extended, respectively, from first and second stator sectors on one side of said toothed opening, into proximity with a first of said magnetic tracks; and third and fourth ferromagnetic flux conductors extended, respectively, from third and fourth stator sectors on an opposite side of said toothed opening from said first and second stator sectors, into proximity with a second of said magnetic tracks, whereby movement of signals recorded on said magnetic tracks past said flux conductors induces magnetic polarities in said first to fourth stator sectors which cause said indicator wheel to roll along said toothed opening from a first position revealing said first indicium to a second position revealing said second indicium.

47. A cartridge according to claim 46, wherein said axis is transverse to a direction of movement of said strip or sheet through said exit slit.

48. A cartridge according to claim 46, wherein said indicator wheel is a disk with said first and second indicia on one side thereof.

49. A cartridge according to claim 46, further comprising a mechanism for preventing rotation of said indicator wheel when said strip or sheet is inserted into said cartridge following exposure.

50. A cartridge according to claim 46, wherein said flux conductors comprise inductive coils.

51. A cartridge according to claim 46, wherein said flux conductors comprise a central core of ferromagnetic material and a coil of electrically conductive material around said central core.

52. A cartridge according to claim 1, wherein said web material is a light sensitive photographic medium; said magnetic member comprises a pair of magnetic tracks on said strip or sheet extended in a direction of withdrawal from said cartridge body; and said magnetically actuated indicator comprises:

a frame supported on said cartridge body;

an indicator wheel supported by said frame for rotation about an axis, said wheel having a first number of radially outwardly extended gear teeth, said gear teeth and spaces between said gear teeth having opposite magnetic polarities;

a first indicium on said indicator wheel for showing an Unexposed status of said photographic medium;

a second indicium on said indicator wheel for showing a Loaded status of said photographic medium;

a third indicium on said indicator wheel for showing an Exposed status of said photographic medium;

an opening in said frame through which one of said indicia is visible externally of said indicator;

a plurality of stator sectors supported by said frame around said indicator wheel, said stator sectors being circumferentially spaced from each other around a toothed opening having a second, greater number of radially inwardly extended gear teeth;

first and second ferromagnetic flux conductors extended, respectively, from first and second stator sectors on one side of said toothed opening, into proximity with a first of said magnetic tracks; and third and fourth ferromagnetic flux conductors extended, respectively, from third and fourth stator sectors on an opposite side of said toothed opening from said first and second stator sectors, into proximity with a second of said magnetic tracks, whereby movement of signals recorded on said magnetic tracks past said flux conductors induces magnetic polarities in said first to fourth stator sectors which cause said indicator wheel to roll along said toothed opening from a first position revealing said Unexposed indicium, to a second position revealing said Loaded indicium, to a third position revealing said Exposed indicium.

53. A cartridge according to claim 52, wherein said axis is transverse to a direction of movement of said strip or sheet through said exit slit.

54. A cartridge according to claim 52, wherein said indicator wheel is a disk with said first, second, and third indicia on one side thereof.

55. A cartridge according to claim 52, further comprising a mechanism for preventing rotation of said indicator member when said photographic medium is inserted into said cartridge following exposure.

56. A cartridge according to claim 52, wherein said flux conductors comprise inductive coils.

57. A cartridge according to claim 52, wherein said flux conductors comprise a central core of ferromagnetic material and a coil of electrically conductive material around said central core.

58. A light sensitive photographic medium, comprising:

a strip or sheet of web material;

a light sensitive photographic material on said strip or sheet; and at least one magnetic means carried on said strip or sheet for actuating an indicator on a cartridge body for said strip or sheet.

59. A light sensitive photographic medium, comprising:

a strip or sheet of web material;

a light sensitive photographic material on said strip or sheet; and at least one permanent magnet carried on said strip or sheet for actuating an indicator on a cartridge body for said strip or sheet.

60. A light sensitive photographic medium, comprising:

a strip or sheet of web material;

a light sensitive photographic material on said strip or sheet; and at least two permanent magnets, spaced along said strip or sheet at locations corresponding to different exposure statuses of said medium, for actuating an indicator on a cartridge body for said strip or sheet.

61. A photographic medium according to claim 58, wherein said magnetic means comprises a discrete stripe of magnetic material, said stripe being transverse to a direction of withdrawal of said strip or sheet from a cartridge body.

62. A photographic medium according to claim 58, wherein said magnetic means comprises a discrete stripe of magnetic material, said stripe being extended along said strip or sheet in a direction of withdrawal from a cartridge body.

63. A photographic medium according to claim 62, wherein said stripe has first and second portions, said portions being located at first and second distances from a longitudinal edge of said strip or sheet.

64. A photographic medium according to claim 63, wherein said first portion corresponds to an Unexposed status of said medium; and said second portion corresponds to a Loaded status of said medium, further comprising:

a third portion of said magnetic track located at a third distance from said longitudinal edge, said third portion corresponding to an Exposed status of said medium.

65. A photographic medium according to claim 58, wherein said magnetic means comprises a magnetic track extended along said strip or sheet in a direction of withdrawal from a cartridge body and magnetic signals recorded on said track for actuating the indicator.

* * * * *